United States Patent
Myung et al.

(10) Patent No.: US 10,708,894 B2
(45) Date of Patent: Jul. 7, 2020

(54) METHOD FOR PERFORMING PHYSICAL UPLINK CONTROL CHANNEL TRANSMISSION AND USER EQUIPMENT USING THE SAME

(71) Applicant: LG ELECTRONICS INC., Seoul (KR)

(72) Inventors: Sechang Myung, Seoul (KR); Suckchel Yang, Seoul (KR); Seonwook Kim, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/397,950

(22) Filed: Apr. 29, 2019

(65) Prior Publication Data

US 2019/0261356 A1 Aug. 22, 2019

Related U.S. Application Data

(63) Continuation of application No. PCT/KR2019/000538, filed on Jan. 14, 2019.

(Continued)

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1819* (2013.01); *H04L 5/00* (2013.01);
(Continued)

(58) Field of Classification Search
CPC .......... H04W 72/0413; H04W 48/12; H04W 72/1284; H04W 72/1289; H04W 72/1294
See application file for complete search history.

(56) References Cited

U.S. PATENT DOCUMENTS

2010/0080184 A1* 4/2010 Tseng ................ H04L 1/08
370/329
2013/0034073 A1 2/2013 Aiba et al.
(Continued)

FOREIGN PATENT DOCUMENTS

| WO | 2018/194436 A1 | 10/2018 |
| WO | 2018/203718 A1 | 11/2018 |
| WO | 2019/137366 A1 | 7/2019 |

OTHER PUBLICATIONS

LG Electronics, "Remaining aspects of PUCCH resource allocation for NR", R1-1719928, 3GPP TSG RAN WG1 Meeting #91, Reno, USA, Nov. 27-Dec. 1, 2017.
(Continued)

*Primary Examiner* — Robert M Morlan
(74) *Attorney, Agent, or Firm* — Dentons US LLP

(57) ABSTRACT

The present invention provides a method for performing physical uplink control channel transmission of a user equipment in a wireless communication system. The method may include the steps of receiving system information from a base station, wherein the system information includes information on one PUCCH resource set among a plurality of PUCCH resource sets, and performing PUCCH transmission through one PUCCH resource included in the one PUCCH resource set, wherein each of the plurality of PUCCH resource sets is related to one starting symbol, one number of symbols, and one PUCCH format.

9 Claims, 21 Drawing Sheets

Related U.S. Application Data

(60) Provisional application No. 62/616,460, filed on Jan. 12, 2018, provisional application No. 62/620,406, filed on Jan. 22, 2018.

(51) Int. Cl.
  *H04W 48/12* (2009.01)
  *H04W 72/12* (2009.01)
  *H04W 88/06* (2009.01)
  *H04W 48/08* (2009.01)
  *H04W 72/02* (2009.01)
  *H04L 5/00* (2006.01)

(52) U.S. Cl.
  CPC ........... *H04W 48/08* (2013.01); *H04W 48/12* (2013.01); *H04W 72/02* (2013.01); *H04W 72/04* (2013.01); *H04W 72/1289* (2013.01); *H04W 88/06* (2013.01); *H04L 5/0007* (2013.01)

(56) References Cited

U.S. PATENT DOCUMENTS

| | | | |
|---|---|---|---|
| 2013/0301600 A1 | 11/2013 | Park | |
| 2018/0084593 A1* | 3/2018 | Chen | H04W 76/11 |
| 2018/0295608 A1* | 10/2018 | Nguyen | H04L 5/001 |
| 2018/0310257 A1* | 10/2018 | Papasakellariou | H04W 52/30 |
| 2018/0324773 A1* | 11/2018 | Fu | H04W 72/044 |

OTHER PUBLICATIONS

Catt, "Further discussion on PUCCH resource allocation", R1-1720201, 3GPP TSG RAN WG1 Meeting #91, Reno, USA, Nov. 27-Dec. 1, 2017.

NEC, "Resource allocation for NR PUCCH", R1-1720380, 3GPP TSG RAN WG1 Meeting 91, Reno, Nevada, Nov. 27-Dec. 1, 2017.

OPPO, "Summary of offline discussion on PUCCH resource allocation", 3GPP TSG RAN WG1 Meeting 91, Nov. 27-Dec. 1, 2017, R1-1721559.

OPPO, "Summary of offline discussion on PUCCH resource allocation", 3GPP TSG RAN WG1 Meeting 91, Nov. 27-Dec. 1, 2017, R1-1721685.

CATT: "On PUCCH resource allocation", R1-1717832, 3GPP TSG RAN WG1 Meeting #90bis, Prague, Czech Republic, Oct. 9-13, 2017.

CR to 38.213 capturing the RAN1 #94bis and RAN1 #95 Meeting Agreements, 3GPP TSG RAN WG1 Meeting #95, R1-1814394, Spokane, USA, Nov. 12-16, 2018.

* cited by examiner

METHOD FOR PERFORMING PHYSICAL UPLINK CONTROL CHANNEL TRANSMISSION AND USER EQUIPMENT USING THE SAME

CROSS-REFERENCE TO RELATED APPLICATIONS

Pursuant to 35 U.S.C. § 119(e), this application is a continuation of International Application PCT/KR2019/000538, with an international filing date of Jan. 14, 2019, which claims the benefit of U.S. Provisional Patent Applications Nos. 62/616,460, filed on Jan. 12, 2018 and 62/620,406, filed on Jan. 22, 2018, the contents of which are hereby incorporated by reference herein in its entirety.

BACKGROUND OF THE INVENTION

Field of the Invention

The present invention relates to wireless communication and, most particularly, to a method for performing physical uplink control channel (PUCCH) transmission and a user equipment using the same.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present invention for convenience.

Flexibility is considered as an important design philosophy for supporting various services in the NR system. Characteristically, when naming a scheduling unit as a slot, a structure in which any slot may be dynamically changed to a physical downlink shared channel (PDSCH) transmission slot (hereinafter, DL slot) or a physical uplink shared channel (PUSCH) transmission slot (hereinafter, UL slot) will be supported. Here, PDSCH is a physical channel for transmitting DL data and PUSCH is a physical channel for transmitting UL data. Hereinafter, the structure may be referred to as a dynamic DL/UL configuration. When the dynamic DL/UL configuration is supported in the NR system, a physical channel PUCCH transmitting hybrid automatic repeat request-acknowledgement (HARQ-ACK) information for the PDSCH scheduled in the DL slot and/or UL control information such as channel state information (CSI) can be transmitted in an area where UL transmission is possible.

The base station may indicate a PUCCH transmission to the UE through the DCI, and, at this point, a slot to which the PUCCH is to be transmitted, a starting symbol corresponds to a time point where the transmission starts within the corresponding slot, and a transmission duration time indicating through how many symbols the transmission is to be carried out should be notified.

At this point, the adoption of a new method for performing PUCCH transmission resource selection and PUCCH transmission in an NR system, which considers flexibility and adopts a new structure, is needed.

SUMMARY OF THE INVENTION

Technical Objects

In order to resolve the technical problems of the present invention, a technical object of the present invention is to provide a method for performing physical uplink control channel (PUCCH) transmission and a user equipment using the same.

Technical Solutions

In one aspect, provided is a method for performing a physical uplink control channel (PUCCH) transmission of a terminal in a wireless communication system. The method includes receiving system information from a base station and performing the PUCCH transmission based on a PUCCH resource in the PUCCH resource set. The system information includes information for a PUCCH resource set of a plurality of PUCCH resource sets. Each of the plurality of PUCCH resource sets is related to a starting symbol, a number of symbols and a PUCCh format.

The plurality of PUCCH resource sets may be pre-defined.

A number of the pre-defined plurality of PUCCH resource sets may be 16.

The pre-defined plurality of PUCCH resource sets may be respectively related to PUCCH format 0 or PUCCH format 1.

Each of the plurality of PUCCH resource sets may be related to the PUCCH format and a combination of the starting symbol and the number of symbols.

The system information may be Remaining System Information (RMSI).

The one PUCCH resource may be selected based on Downlink Control Information (DCI).

The UE may not be configured a dedicated PUCCH resource.

The UE may perform the PUCCH transmission using the one PUCCH resource set until the UE is configured with the dedicated PUCCH resource.

In another aspect, provided is a user equipment (UE). The UE includes a transceiver transmitting and receiving radio signals and a processor being operatively connected to the transceiver. The processor is configured to receive system information from a base station and perform PUCCH transmission through one PUCCh resource included in the one PUCCH resource set. The system information includes information on one PUCCH resource set among a plurality of PUCCH resource sets. Each of the plurality of PUCCH resource sets is related to one starting symbol, one number of symbols, and one PUCCH format.

The plurality of PUCCH resource sets may be pre-defined.

A number of the pre-defined plurality of PUCCH resource sets may be 16.

The pre-defined plurality of PUCCH resource sets may be respectively related to PUCCH format 0 or PUCCH format 1.

A number of symbols of the pre-defined plurality of PUCCH resource sets may include 2, 10, and 14.

In another aspect, provided is a method for receiving a physical uplink control channel (PUCCH) of a base station in a wireless communication system. The method includes transmitting system information to a user equipment (UE) and receiving a PUCCH from the UE. The system information includes information for one PUCCH resource set among a plurality of PUCCH resource sets. The PUCCH is transmitted based on the one PUCCH resource included in the one PUCCH resource set.

Effects of the Invention

According to the present invention, PUCCH transmission resource selection and its respective PUCCH transmission may be more efficiently achieved in the NR system, which considers flexibility and adopts a new structure.

DESCRIPTION OF EXEMPLARY EMBODIMENTS

Figure 1:
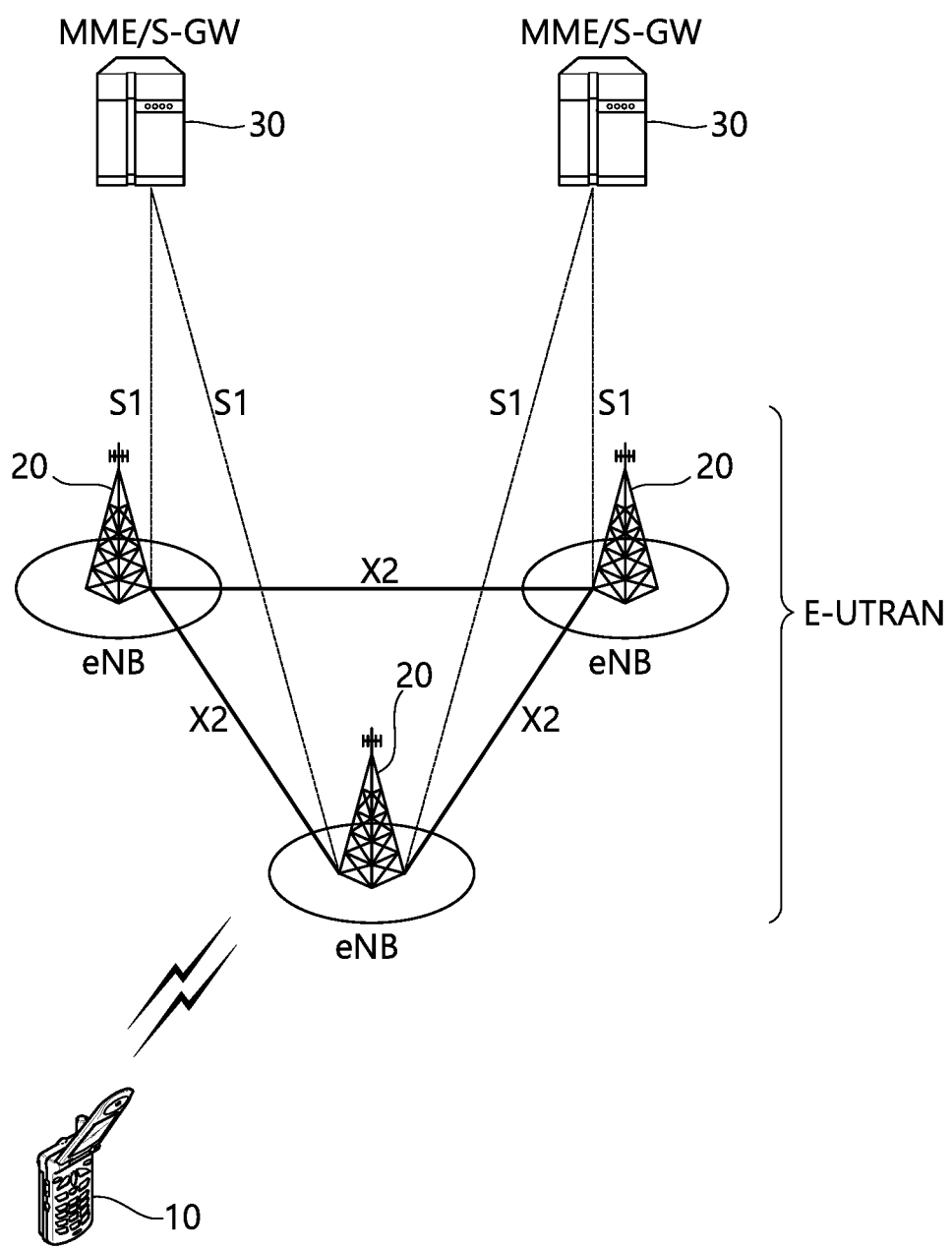
FIG. 1 shows a wireless communication system to which the present invention may be applied.

FIG. 1 shows a wireless communication system to which the present invention may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
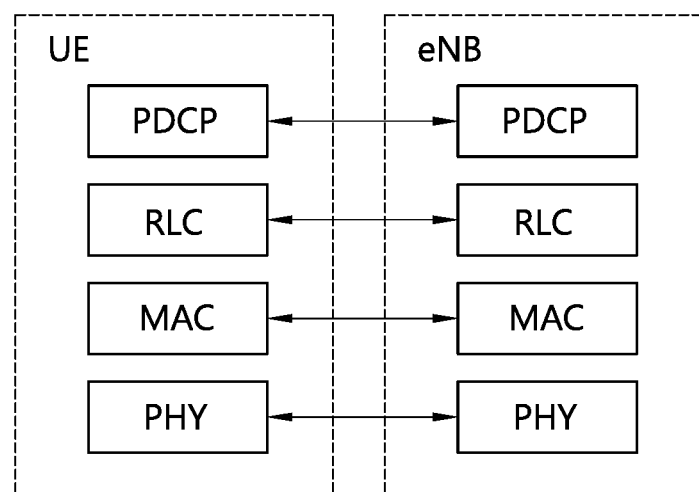
FIG. 2 is a diagram showing a wireless protocol architecture for a user plane.
Figure 3:
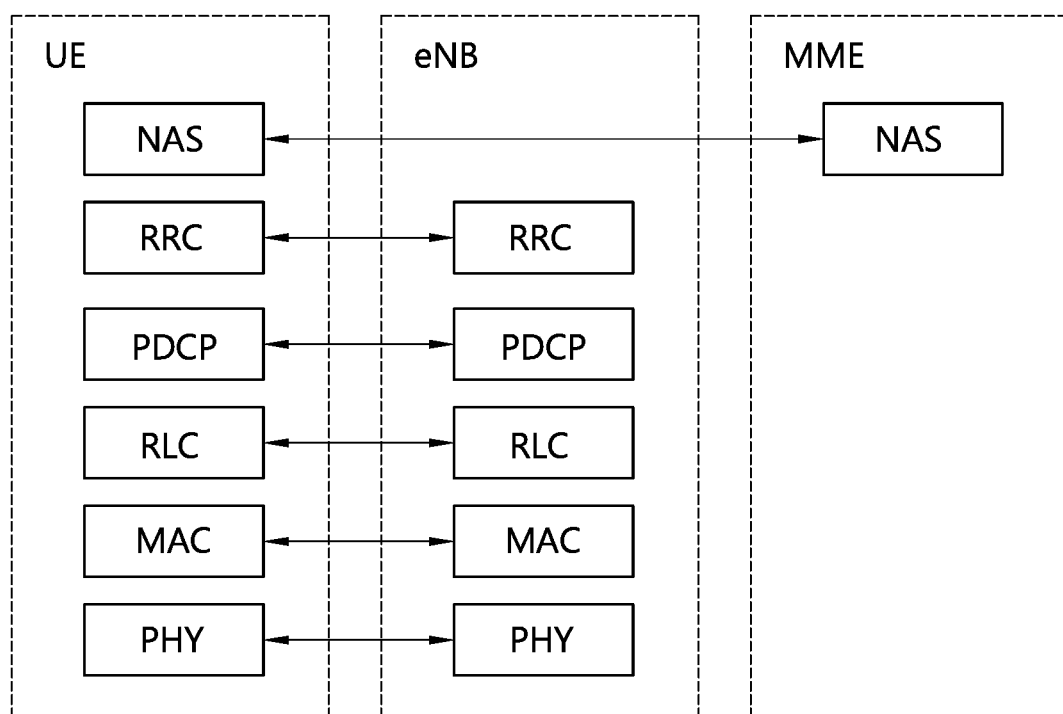
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, radio resource management (RRM) measurement in LTE system will be described.

RRM operation including power control, scheduling cell search, cell reselection, handover, radio link or connection monitoring, connection establishment/re-establishment is supported in the LTE system. At this point, a serving cell may request RRM measurement information, which is a measurement value for performing RRM operation, to the UE. Typically, a UE may measure and report information such as cell search information for each cell, reference signal received power (RSRP), and reference signal received quality (RSRQ) in the LTE system. Specifically, in the LTE system a UE receives a higher layer signal 'measConfig' for RRM measurement from the serving cell. The UE measures RSRP or RSRQ according to the information 'measConfig'. Here, reference signal received power (RSRP), reference signal received quality (RSRQ), and received signal strength indicator (RSSI) defined in the LTE system can be defined as follows.

<RSRP>

Reference signal received power (RSRP), is defined as the linear average over the power contributions (in [W]) of the resource elements that carry cell-specific reference signals within the considered measurement frequency bandwidth. For RSRP determination the cell-specific reference signals R0 according TS 36.211 shall be used. If the UE can reliably detect that R1 is available it may use R1 in addition to R0 to determine RSRP. The reference point for the RSRP shall be the antenna connector of the UE. If receiver diversity is in use by the UE, the reported value shall not be lower than the corresponding RSRP of any of the individual diversity branches.

<RSRQ>

Reference Signal Received Quality (RSRQ) is defined as the ratio N×RSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes. The reference point for the RSRQ shall be the antenna connector of the UE. If receiver diversity is in use by the UE, the reported value shall not be lower than the corresponding RSRQ of any of the individual diversity branches.

<RSSI>

The received wide band power, including thermal noise and noise generated in the receiver, within the bandwidth defined by the receiver pulse shaping filter. The reference point for the measurement shall be the antenna connector of the UE. If receiver diversity is in use by the UE, the reported value shall not be lower than the corresponding UTRA carrier RSSI of any of the individual receive antenna branches.

According to the above definitions, a terminal operating in the LTE system is allowed to measure RSRP in a bandwidth corresponding to one of 6, 15, 25, 50, 75, 100 resource blocks (RBs) through an information element (IE) related to an allowed measurement bandwidth transmitted in system information block type 3 (SIB 3) in the case of an intra-frequency measurement, or through an IE related to an allowed measurement bandwidth transmitted in SIB 5 in the case of an inter-frequency measurement. Or, the UE may measure in the frequency band of the entire DL system by default if the IEs do not exist. Here, when the UE receives the allowed measurement bandwidth, the UE considers the corresponding value as a maximum measurement bandwidth and may measure the value of RSRP freely within the corresponding value. However, if the serving cell transmits an IE defined by wideband-RSRQ (WB-RSRQ), and the allowed measurement bandwidth is set to 50 RBs or more, the UE shall calculate the RSRP value for the overall allowed measurement bandwidth. Meanwhile, the RSSI may be measured in the frequency band of the receiver of the UE according to the definition of the RSSI bandwidth.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present invention for convenience.

Figure 4:
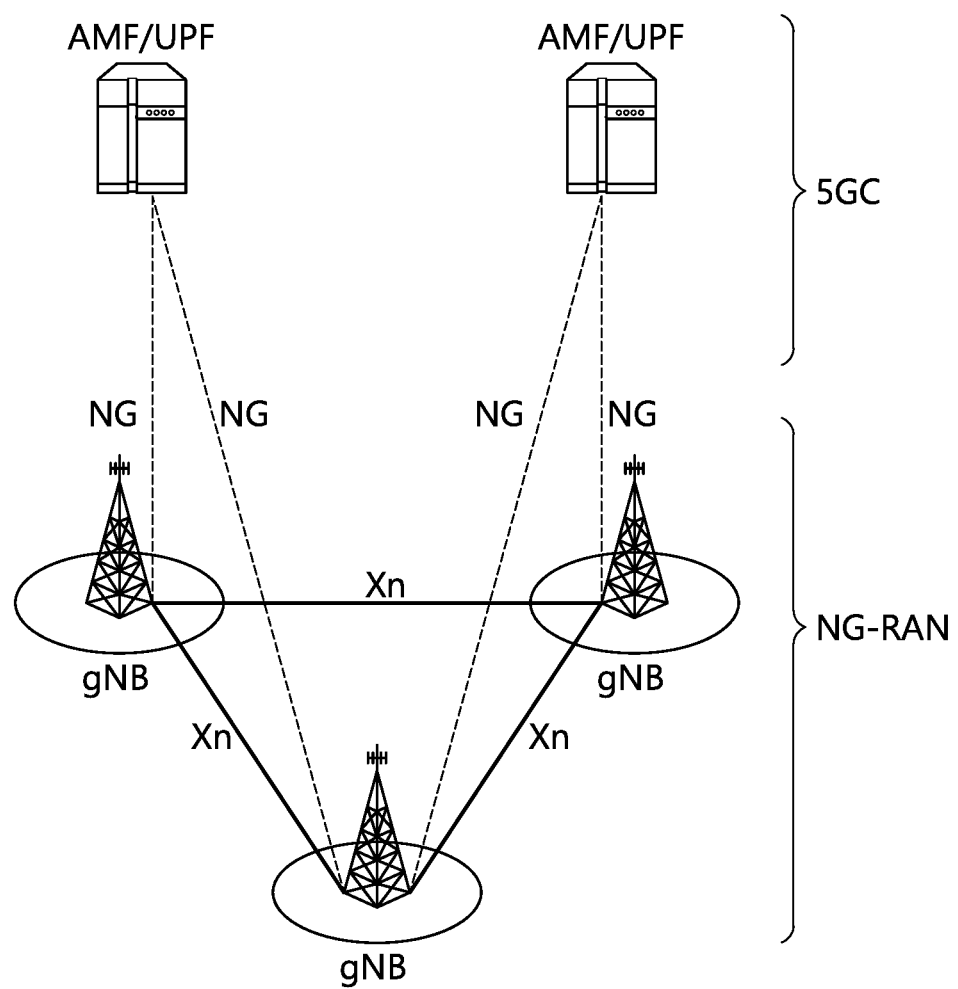
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
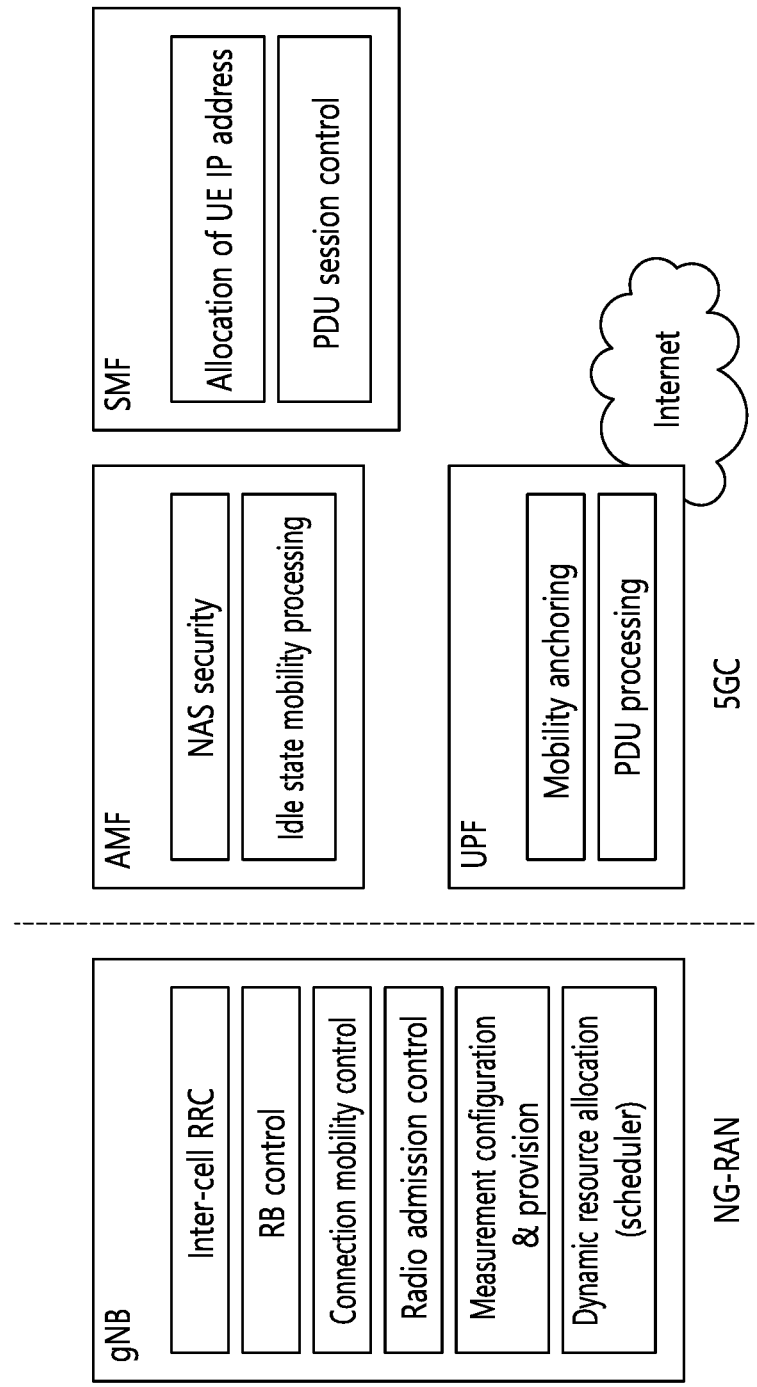
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
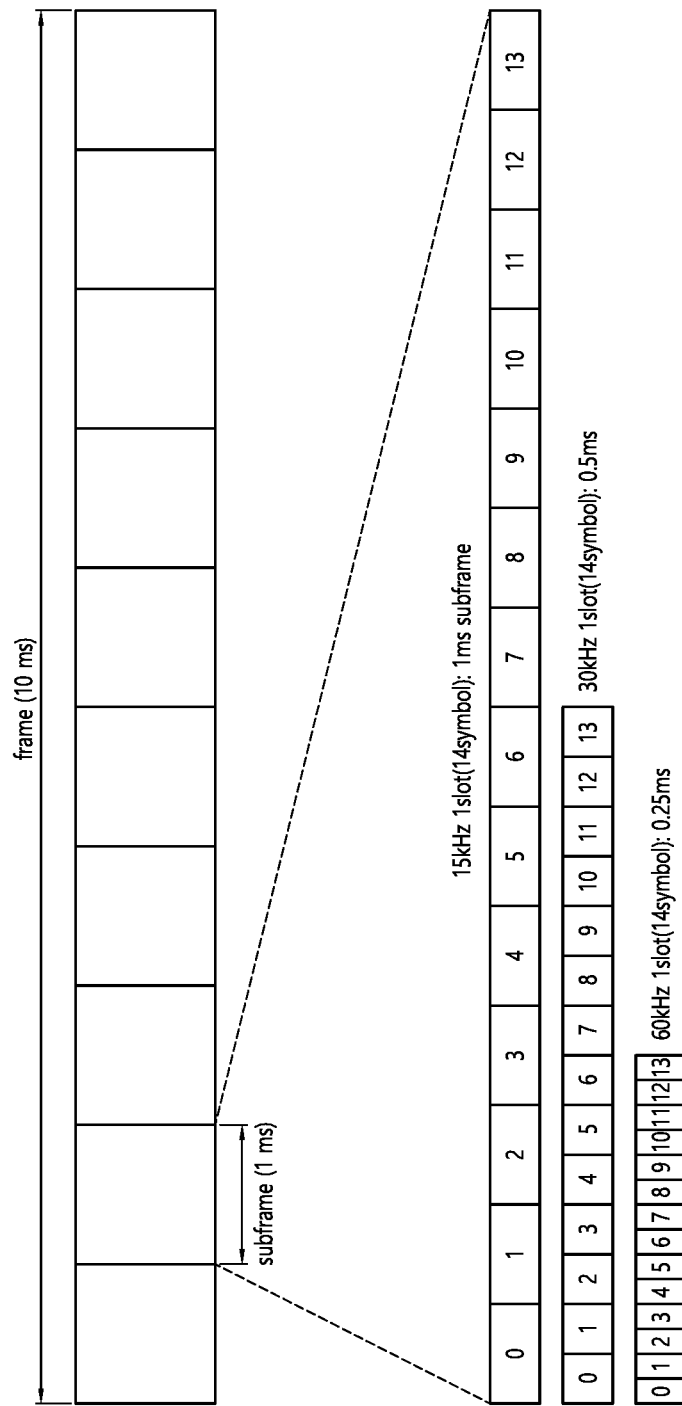
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration.

TABLE 1

| μ | $\Delta f = 2^\mu \cdot 15 [kHz]$ | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations μ.

TABLE 2

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
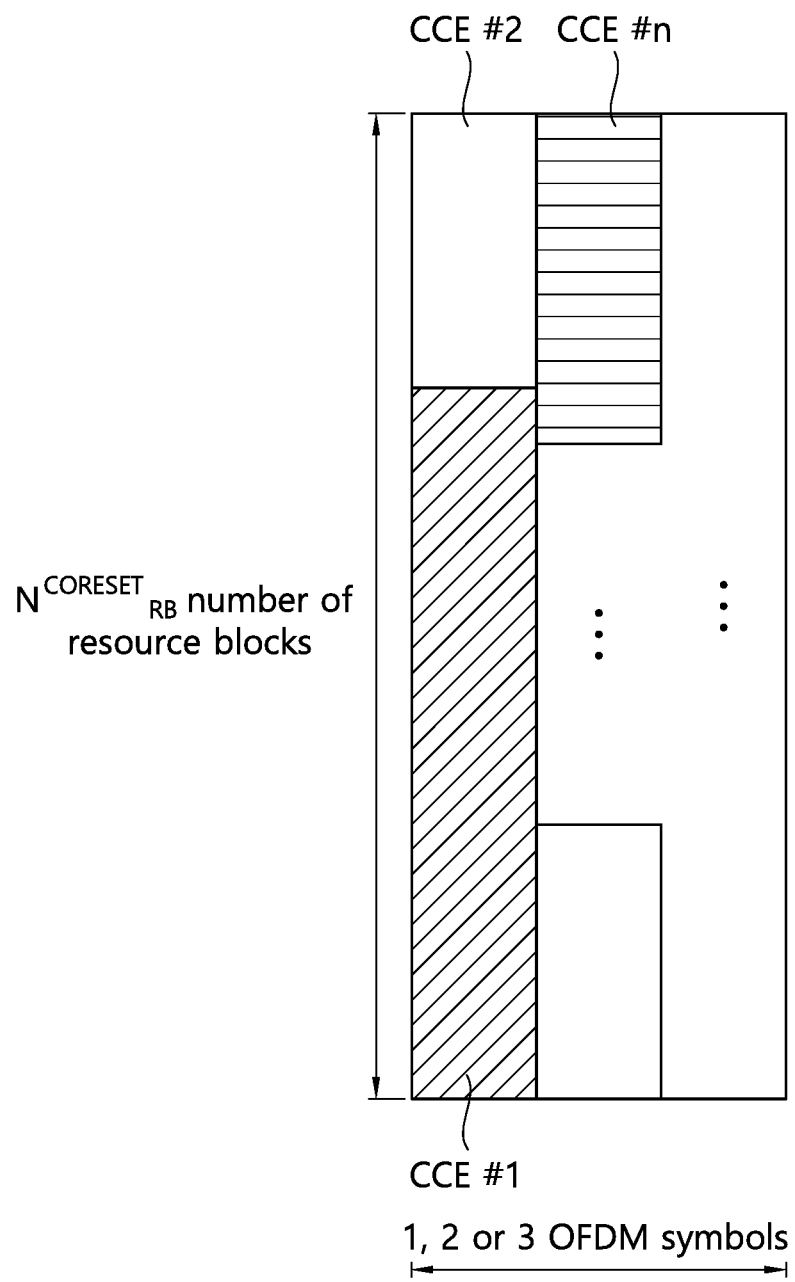
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
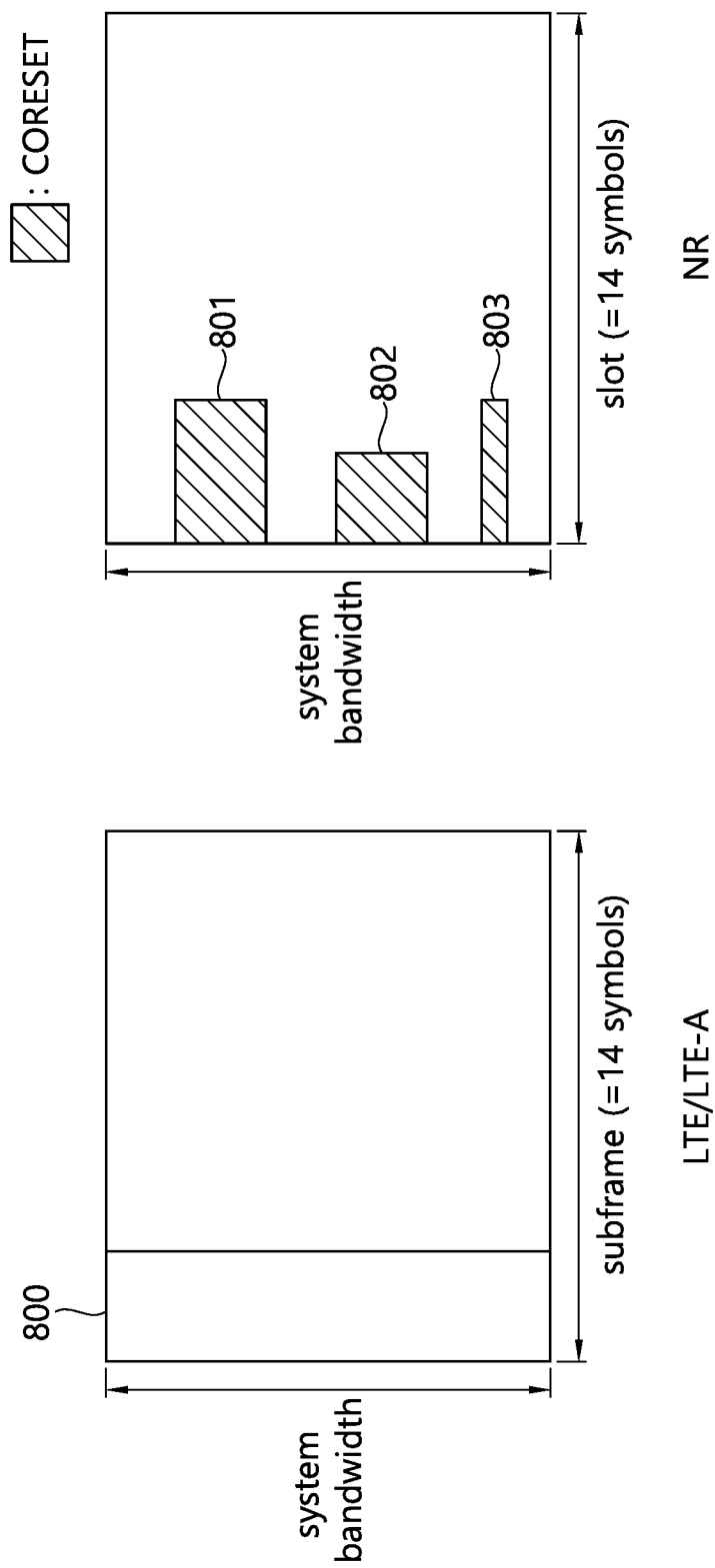
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORE-SET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
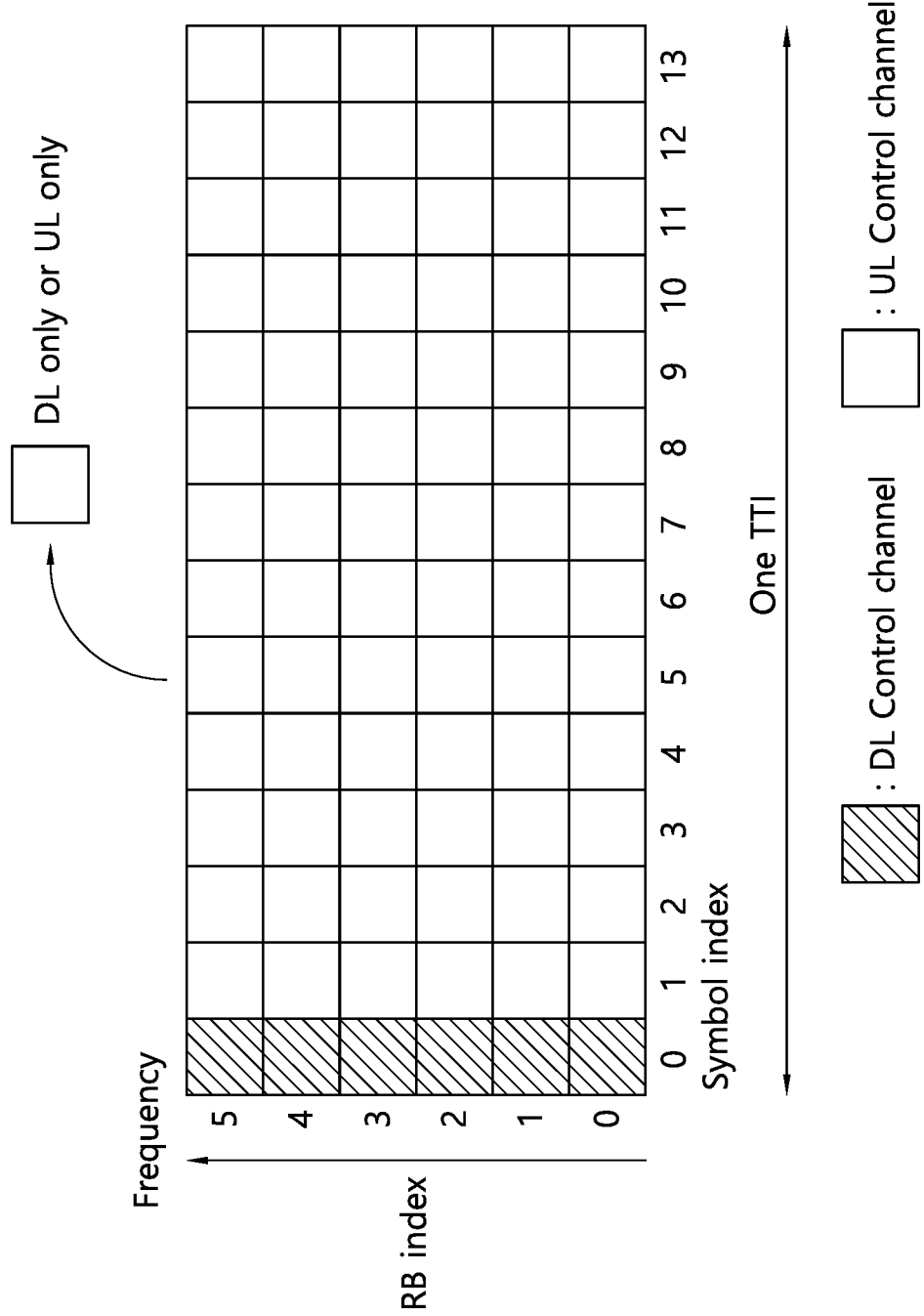
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
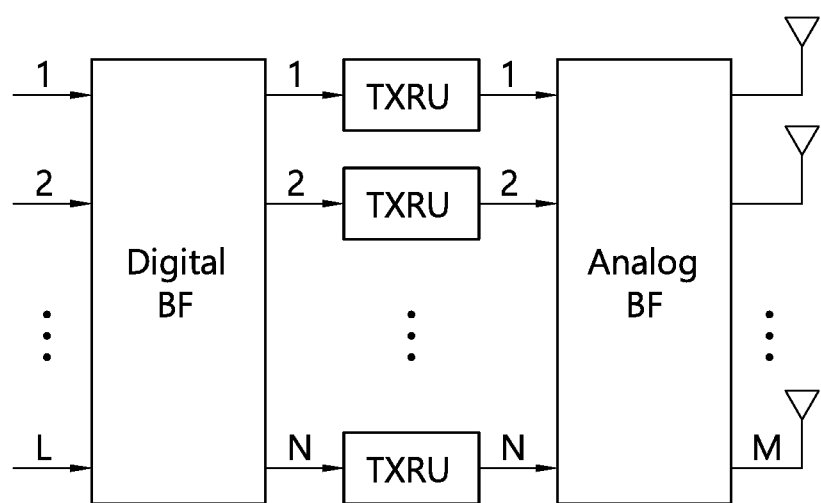
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
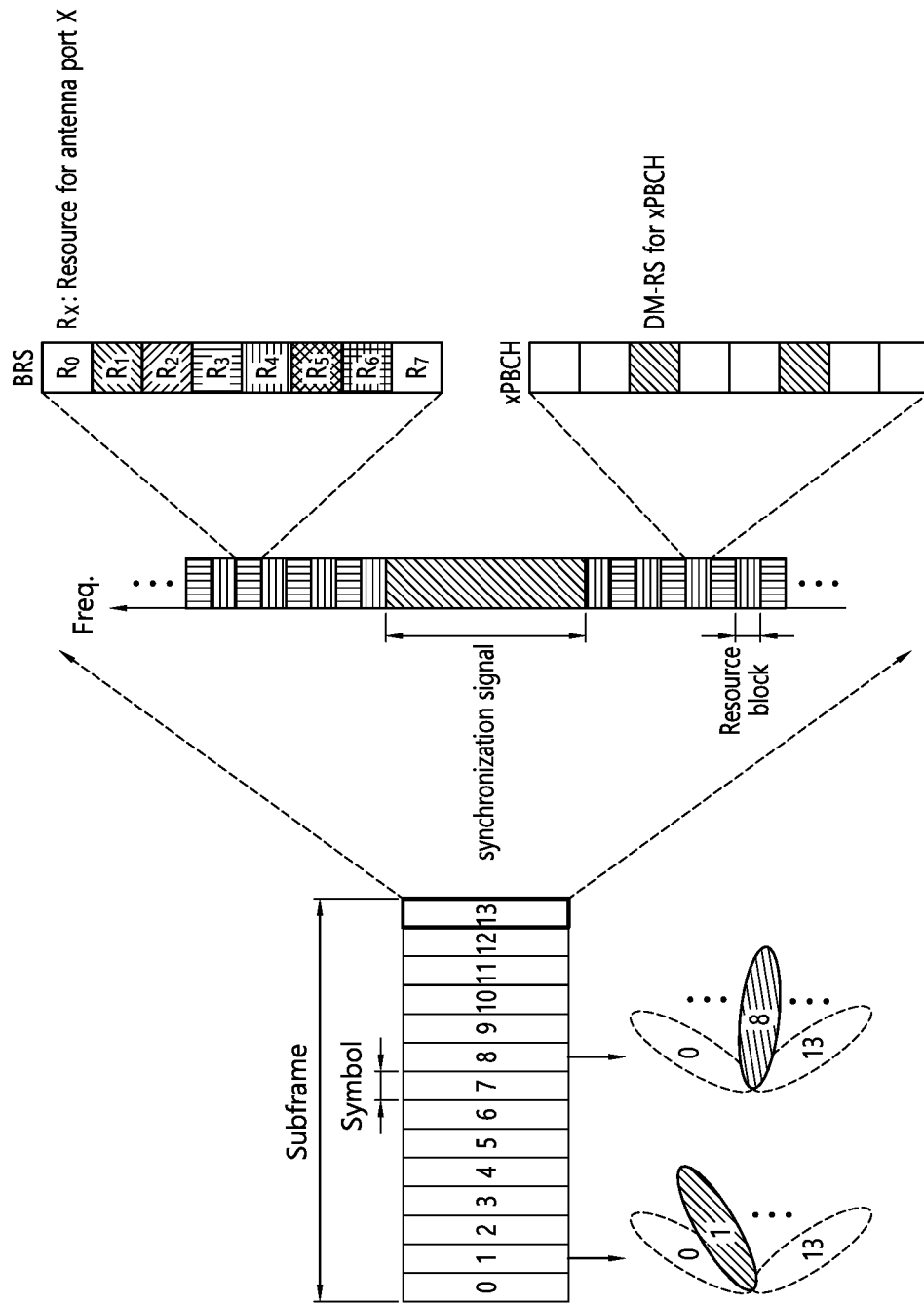
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

Meanwhile, in relation to PUCCH and PUCCH resources, the following rules/details may be applied.

UCI types reported in a PUCCH include HARQ-ACK information, SR, and CSI. UCI bits include HARQ-ACK information bits, SR information bits, or CSI bits.

A UE may transmit one or two PUCCHs on a serving cell in different symbols within a slot of $N_{symb}^{slot}$ symbols. When the UE transmits two PUCCHs in a slot, at least one of the two PUCCHs uses PUCCH format 0 or PUCCH format 2.

If a UE does not have dedicated PUCCH resource configuration, provided by higher layer parameter PUCCH-ResourceSet in PUCCH-Config, a PUCCH resource set is provided by higher layer parameter pucch-ResourceCommon in SystemInformationBlockType1 through an index to a row of Table 4 for transmission of HARQ-ACK information on PUCCH in an initial active UL BWP of $N_{BWP}^{size}$ PRBs provided by SystemInformationBlockType1. The PUCCH resource set includes sixteen resources, each corresponding to a PUCCH format, a first symbol, a duration, a PRB offset $RB_{BWP}^{offset}$, and a cyclic shift index set for a PUCCH transmission. The UE transmits a PUCCH using frequency hopping. An orthogonal cover code with index 0 is used for a PUCCH resource with PUCCH format 1 in Table 4. The UE transmits the PUCCH using the same spatial domain transmission filter as for the Msg3 PUSCH transmission.

The UE does not expect to generate more than one HARQ-ACK information bit prior to establishing RRC connection.

If the UE provides HARQ-ACK information in a PUCCH transmission in response to detecting a DCI format 1_0 or DCI format 1_1, the UE determines a PUCCH resource with index $r_{PUCCH}$, $0 \le r_{PUCCH} \le 15$, as $$r_{PUCCH} = \left\lfloor \frac{2 \cdot n_{CCE,0}}{N_{CCE}} \right\rfloor + 2 \cdot \Delta_{PRI},$$

where $N_{CCE}$ is a number of CCEs in a control resource set of a PDCCH reception with DCI format 1_0 or DCI format 1_1, $n_{CCE,0}$ is the index of a first CCE for the PDCCH reception, and $\Delta_{PRI}$ is a value of the PUCCH resource indicator field in the DCI format 1_0 or DCI format 1_1.

If $\lfloor r_{PUCCH}/8 \rfloor = 0$
the UE determines the PRB index of the PUCCH transmission in the first hop as $RB_{BWP}^{offset} + \lfloor r_{PUCCH}/N_{CS} \rfloor$ and the PRB index of the PUCCH transmission in the second hop as $N_{BWP}^{size} - 1 - RB_{BWP}^{offset} - \lfloor r_{PUCCH}/N_{CS} \rfloor$, where $N_{CS}$ is the total number of initial cyclic shift indexes in the set of initial cyclic shift indexes.

the UE determines the initial cyclic shift index in the set of initial cyclic shift indexes as $r_{PUCCH}$ mod $N_{CS}$.

If $\lfloor r_{PUCCH}/8 \rfloor = 1$,
the UE determines the PRB index of the PUCCH transmission in the first hop as $N_{BWP}^{size} - 1 - RB_{BWP}^{offset} - \lfloor (r_{PUCCH}-8)/N_{CS} \rfloor$ and the PRB index of the PUCCH transmission in the second hop as $RB_{BWP}^{offset} + \lfloor (r_{PUCCH}-8)/N_{CS} \rfloor$.

the UE determines the initial cyclic shift index in the set of initial cyclic shift indexes as $(r_{PUCCH}-8)$ mod $N_{CS}$.

TABLE 4

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

If a UE has dedicated PUCCH resource configuration, the UE is provided by higher layers with one or more PUCCH resources.

A PUCCH resource includes the following parameters:
a PUCCH resource index provided by higher layer parameter pucch-ResourceId
an index of the first PRB prior to frequency hopping or for no frequency hopping by higher layer parameter startingPRB
an index of the first PRB after frequency hopping by higher layer parameter secondHopPRB
an indication for intra-slot frequency hopping by higher layer parameter intraSlotFrequencyHopping
a configuration for a PUCCH format, from PUCCH format 0 through PUCCH format 4, provided by higher layer parameter format If the higher layer parameter format indicates PUCCH-format 0, the PUCCH format configured for a PUCCH resource is PUCCH format 0, where the PUCCH resource also includes an index for an initial cyclic shift provided by higher layer parameter initialCyclicShift, a number of symbols for a PUCCH transmission provided by higher layer parameter nrofSymbols, a first symbol for the PUCCH transmission provided by higher layer parameter startingSymbolIndex.

If the higher layer parameter format indicates PUCCH-format1, the PUCCH format configured for a PUCCH resource is PUCCH format 1, where the PUCCH resource also includes an index for an initial cyclic shift provided by higher layer parameter initialCyclicShift, a number of symbols for a PUCCH transmission provided by higher layer parameter nrofSymbols, a first symbol for the PUCCH transmission provided by higher layer parameter startingSymbolIndex, and an index for an orthogonal cover code by higher layer parameter timeDomainOCC.

If the higher layer parameter format indicates PUCCH-format2 or PUCCH-format3, the PUCCH format configured for a PUCCH resource is PUCCH format 2 or PUCCH format 3, respectively, where the PUCCH resource also includes a number of PRBs provided by higher layer parameter nrofPRBs, a number of symbols for a PUCCH transmission provided by higher layer parameter nrofSymbols, and a first symbol for the PUCCH transmission provided by higher layer parameter startingSymbolIndex.

If the higher layer parameter format indicates PUCCH-format4, the PUCCH format configured for a PUCCH resource is PUCCH format 4, where the PUCCH resource also includes a number of symbols for a PUCCH transmission provided by higher layer parameter nrofSymbols, a length for an orthogonal cover code by higher layer parameter occ-Length, an index for an orthogonal cover code by higher layer parameter occ-Index, and a first symbol for the PUCCH transmission provided by higher layer parameter startingSymbolIndex.

A UE can be configured up to four sets of PUCCH resources. A PUCCH resource set is provided by higher layer parameter PUCCH-ResourceSet and is associated with a PUCCH resource set index provided by higher layer parameter pucch-ResourceSetId, with a set of PUCCH resource indexes provided by higher layer parameter resourceList that provides a set of pucch-ResourceId used in the PUCCH resource set, and with a maximum number of UCI information bits the UE can transmit using a PUCCH resource in the PUCCH resource set provided by higher layer parameter maxPayloadMinus1. For the first PUCCH resource set, the maximum number of UCI information bits is 2. A maximum number of PUCCH resource indexes for a set of PUCCH resources is provided by higher layer parameter maxNrofPUCCH-ResourcesPerSet. The maximum number of PUCCH resources in the first PUCCH resource set is 32 and the maximum number of PUCCH resources in the other PUCCH resource sets is 8.

If the UE transmits $N_{UCI}$ UCI information bits, that include HARQ-ACK information bits, the UE determines a PUCCH resource set to be as follows:
- a first set of PUCCH resources with pucch-ResourceSetId=0 if $N_{UCI} \leq 2$ including 1 or 2 HARQ-ACK information bits and a positive or negative SR on one SR transmission occasion if transmission of HARQ-ACK information and SR occurs simultaneously
- a second set of PUCCH resources with pucch-ResourceSetId=1, if provided by higher layers, if $2 < N_{UCI} \leq N_2$ where $N_2$ is provided by higher layer parameter maxPayloadMinus1 for the PUCCH resource set with pucch-ResourceSetId=1
- a third set of PUCCH resources with pucch-ResourceSetId=2, if provided by higher layers, if $N_2 < N_{UCI} \leq N_3$ where $N_3$ is provided by higher layer parameter maxPayloadMinus1 for the PUCCH resource set with pucch-ResourceSetId=2
- a fourth set of PUCCH resources with pucch-ResourceSetId=3, if provided by higher layers, if $N_3 < N_{UCI} \leq 1706$.

Hereinafter, the present invention will be described.

Flexibility is considered as an important design philosophy for supporting various services in the NR system. Characteristically, when naming a scheduling unit as a slot, a structure in which any slot may be dynamically changed to a physical downlink shared channel (PDSCH) transmission slot (hereinafter, DL slot) or a physical uplink shared channel (PUSCH) transmission slot (hereinafter, UL slot) will be supported. Here, PDSCH is a physical channel for transmitting DL data and PUSCH is a physical channel for transmitting UL data. Hereinafter, the structure may be referred to as a dynamic DL/UL configuration. When the dynamic DL/UL configuration is supported in the NR system, a physical channel PUCCH transmitting hybrid automatic repeat request-acknowledgement (HARQ-ACK) information for the PDSCH scheduled in the DL slot and/or UL control information such as channel state information (CSI) can be transmitted in an area where UL transmission is possible.

The base station may indicate a PUCCH transmission to the UE through the DCI, and, at this point, a slot to which the PUCCH is to be transmitted, a starting symbol corresponds to a time point where the transmission starts within the corresponding slot, and a transmission duration time indicating through how many symbols the transmission is to be carried out should be notified. Additionally, in order to support multiplexing through which multiple user equipment transmit the PUCCH by using the same frequency resource within the same symbol, an acknowledge resource indicator (ARI) set, which is configured of a combination of a code resource, such as an orthogonal cover code (OCC) and a cyclic shift (CS), and a frequency resource, shall be defined in order to allocate and indicate the PUCCH resources.

Hereinafter, in the present invention, DL assignment refers to DCI indicating PDSCH scheduling, UL grant refers to DCI indicating PUSCH scheduling, Short PUCCH refers to a PUCCH being transmitted at a 1-symbol or 2-symbol transmission duration time, and Long PUCCH refers to a PUCCH that can be transmitted at a transmission duration from 4 symbols to 14 symbols. An ARI PUCCH resource corresponds to a PUCCH resource through which Uplink control information, which includes HARQ-ACK, CSI, and so on, can be transmitted, and a CSI or SR PUCCH resource refers to an individual PUCCH resource for transmitting each of CSI and SR. A Multi-beam PRACH refers to a case where the direction of a PRACH transmission beam of the UE or a PRACH reception beam of a gNB is variable and not fixed.

When the UE fails to be allocated with a dedicated resource that is to be used for the PUCCH transmission during the initial access procedure or fallback operation, and so on, the UE transmits an HARQ-ACK response by using a PUCCH resource of a default PUCCH resource set, which is indicated through a remaining system information (RMSI) being broadcasted by the corresponding base station. Hereinafter, the present invention proposes a configuration and allocation method of a default PUCCH resource set and the PUCCH resources configuring the default PUCCH resource set.

The PUCCH format will first be described in detail.

A PUCCH transmitting an HARQ-ACK for the PDSCH which is scheduled via DL assignment or an Uplink control information (UCI) such as a CSI may be classified into diverse PUCCH formats in accordance with a payload size and transmission duration time (number of PUCCH transmission symbols) of the corresponding UCI as described below. Herein, the numbers (or indexes) of each PUCCH format have been arbitrarily set up (or assigned) in order to differentiate each of the PUCCH formats from one another.

<PUCCH Format 0>
Size of available UCI payload: up to K bits (Hereinafter, K may be set to K=2.)
Number of OFDM symbols configuring a single PUCCH: from 1 to X symbols (Hereinafter, X may be set to X=2.)
Transmission structure: This format is configured only of UCI signals and no Demodulation Reference Signal (DMRS). And, in this structure, a specific UCI state may be transmitted by selecting/transmitting one specific sequence, among a plurality of specific sequences.

<PUCCH Format 1>
Size of available UCI payload: up to K bits
Number of OFDM symbols configuring a single PUCCH: from Y to Z symbols (Hereinafter, Y may be set to Y=4, and Z may be set to Z=14.)
Transmission structure: In this structure, DMRS and UCI are each configured in/mapped to a different symbol in a Time Division Multiplexing (TDM) format. Herein, the UCI is configured of a specific sequence being multiplied by a modulation symbol (e.g., a Quadrature Phase Shift Keying (QPSK) symbol). And, CS/OCC is applied to both the UCI and DMRS, thereby allowing multiplexing between multiple UEs (or devices) to be supported (within the same RB).

<PUCCH Format 2>
Size of available UCI payload: more than K bits
Number of OFDM symbols configuring a single PUCCH: from 1 to X symbols
Transmission structure: In this structure, the DMRS and UCI are configured in/mapped to the same symbol. And, in this structure, transmission is performed by applying only Inverse Fast Fourier Transform (IFFT) and not Discrete Fourier Transform (DFT) to the coded UCI bits.

<PUCCH Format 3>
Size of available UCI payload: more than K bits
Number of OFDM symbols configuring a single PUCCH: from Y to Z symbols
Transmission structure: In this structure, DMRS and UCI are each configured in/mapped to a different symbol in a TDM format, and, herein, transmission is performed by applying DFT to the coded UCI bits. Also, in this structure, multiplexing between multiple UEs may be supported by applying OCC at a fore end of the UCI and by applying CS (or Interleaved Frequency Division Multiplexing (IFDM)) to the DMRS.

<PUCCH Format 4>
Size of available UCI payload: more than K bits
Number of OFDM symbols configuring a single PUCCH: from Y to Z symbols
Transmission structure: In this structure, DMRS and UCI are each configured in/mapped to a different symbol in a TDM format, and, herein, transmission is performed by applying DFT to the coded UCI bits without performing multiplexing between multiple UEs.

If the UCI payload size that is to be transmitted to the base station during the initial access procedure or fallback operation, and so on, of the UE (or terminal or device) is equal to 2 bits or less, the PUCCH resource configuring a default PUCCH resource set may be configured only of PUCCH format 0 and PUCCH format 1, among the above-described 5 PUCCH formats.

The UEs near the base station may receive RMSI broadcasted by the corresponding base station, and, accordingly, the UEs may acquire information on the PUCCH resource set that is to be used for the transmission of an HARQ-ACK response during the initial access procedure or an HARQ-ACK response during the fallback operation from the corresponding RMSI. For example, if the RMSI is equal to 4 bits, the number of the PUCCH resource sets that may be indicated as the RMSI state may be equal to 16. And, Y number of PUCCH resources each having a different resource parameter combination (or set) may exist within each PUCCH resource set.

The UE may determine one PUCCH resource that is to be used for the PUCCH transmission by performing the procedure that is described below.

Step 0: 16 PUCCH resource sets are defined.
Step 1: One PUCCH resource set, among 16 PUCCH resource sets, is configured by a 4-bit parameter within the RMSI.
Step 2: Among 4 subsets within the PUCCH resource sets, which is configured by a 2-bit ARI field within the DCI, one subset is selected.
Step 3: One PUCCH resource within a subset, which is implicitly mapped by a PDCCH starting CCE index, may be selected.

However, in Step 2, the ARI field may be referred to as a PUCCH resource indication field, and so on, and may be equal to 3 bits and not 2 bits.

When configuring the initial PUCCH resource set of Step 0 and Step 1, the following details shall be considered for the configuration flexibility of the network.

A PUCCH format within the configured PUCCH resource set (Herein, the PUCCH format may correspond to PUCCH format 0 and PUCCH format 1.)
A starting symbol and the number of symbols within a given PUCCH format
A difference (or gap) in cyclic shift (CS) values between the PUCCH resources (Herein, the difference may be equal to 1 or 2 or 3.)

Meanwhile, the resource parameters that should be configured in each PUCCH resource, which configures the PUCCH resource set, and the range of the respective values are as shown below in Table 5.

TABLE 5

| | Format 0-1symbol | Format 0-2symbol | Format 1 | |
| --- | --- | --- | --- | --- |
| Starting symbol | 13 | 12 | 0 | 4 |
| Number of symbols | 1 | 2 | 14 | 10 |
| Frequency resource | PRB 0, PRB 1, PRB N − 2, PRB N − 1 | PRB 0 in $1^{st}$ hop → PRB N − 1 in $2^{nd}$ hop PRB N − 1 in $1^{st}$ hop → PRB 0 in $2^{nd}$ hop | PRB 1 in $1^{st}$ hop → PRB N − 2 in $2^{nd}$ hop PRB N − 2 in $1^{st}$ hop → PRB 1 in $2^{nd}$ hop | |
| Hopping or not | N.A. | Always hop for 2-symbol | Always hop | |
| Index of initial CS | 0-11 | 0-11 | 0-11 | |
| Time-domain OCC | N.A. | N.A. | 0, 1, 2 for 14-symbol. | 0, 1 for 10-symbol |

In other words, a PUCCH format, a starting symbol, a number of symbols, and an index of a starting CS for each PUCCH resource set may be predefined. Herein, the above-described Table 5 is merely an example, and, therefore, the PUCCH resource sets may be defined to be configured of diverse combinations. Additionally, as described above, PUCCH formats, starting symbols, number of symbols, and indexes of the starting CSs for the total of 16 PUCCH resource sets may also be predefined.

With the exception for a 1-symbol PUCCH format 0, transmission is always performed while frequency hopping is in an on state for frequency diversity gain. In Table 5, when N number of physical resource blocks (PRBs) exist in an initial uplink bandwidth part (UL BWP), the frequency resource corresponds to a case where indexing is sequentially performed starting from a lowest frequency PRB as PRB 0. The following methods may be considered as the PRB allocation method.

Option 1: A method of sequentially assigning indexes starting from PRBs positioned at each end of the band in order to maximize frequency diversity, such as PUCCH format 1 of the LTE.

Figure 12:
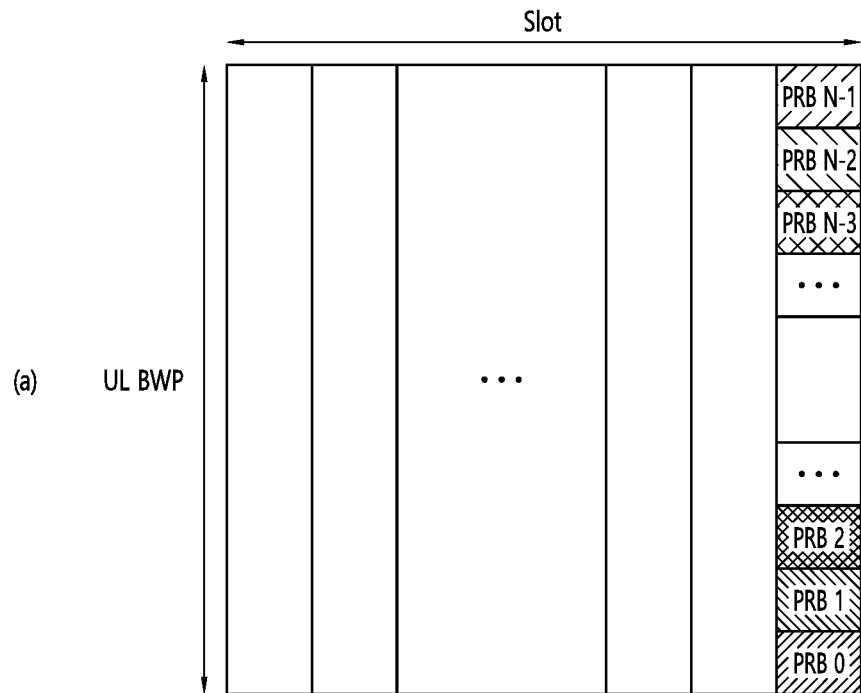
FIG. 12 is an example for describing a PRB resource allocation method of the above-described Method 1.
Figure 12:
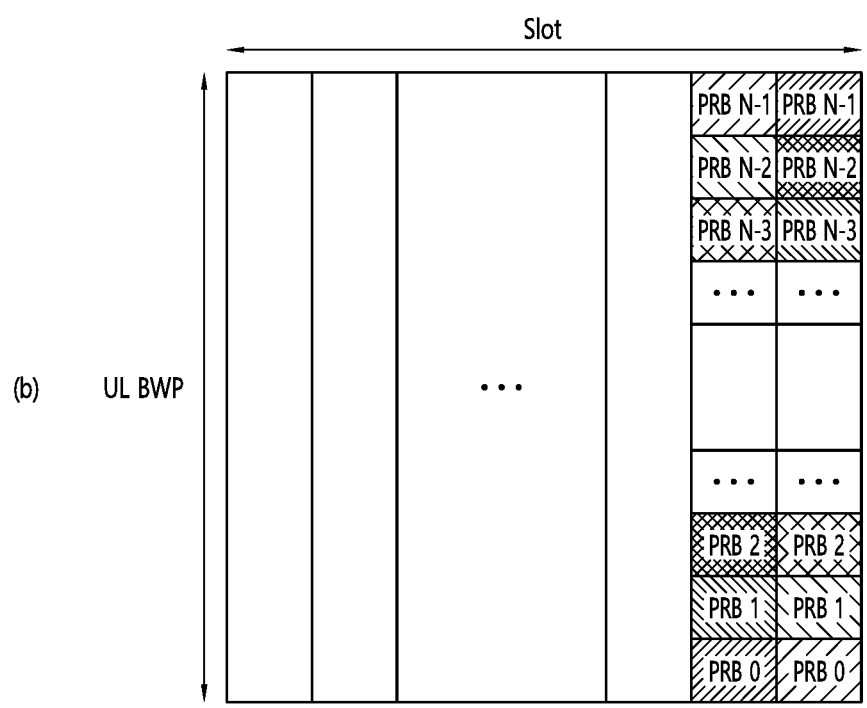

FIG. 12 is an example for describing a PRB resource allocation method of the above-described Method 1.

Example 1

In case of a 1-symbol short PUCCH, as shown in (a) of FIG. 12, the position of the starting symbol corresponds to a last symbol (e.g., a $14^{th}$ symbol) of the slot. And, therefore, indexes are alternately assigned (or allocated) starting from the PRBs located at both ends of the initial UL BWP within the corresponding symbol (e.g., PRB 0 (the lowest PRB)→PRB N−1 (the highest PRB)→PRB 1 (the second lowest PRB)→PRB N−2 (the second highest PRB)→ . . . ).

Example 2

In case of a 2-symbol short PUCCH, as shown in (b) of FIG. 12, the position of the starting symbol corresponds to a second last symbol (e.g., a $13^{th}$ symbol) of the slot. And, therefore, indexes are alternately assigned (or allocated) starting from the PRBs located at both ends of the initial UL BWP within the corresponding symbol. However, in this case, in case the transmission is carried out while performing frequency hopping, the lowest PRB of the $13^{th}$ symbol and the highest PRB of the $14^{th}$ symbol configure the 2-symbol PUCCH (e.g., PRB 0 of the $13^{th}$ symbol, PRB N−1 of the $14^{th}$ symbol→PRB N−1 of the $13^{th}$ symbol, PRB 0 of the $14^{th}$ symbol→ . . . )

Option 2: A method of assigning a PRB starting index through cell ID based arithmetic operation in order to reduce inter-cell interference.

(Example 1) If PUCCH resources are allocated by always indexing the lowest PRB of the UL BWP as PRB 0, there is a likelihood of mutual interference between the cells when a neighboring cell uses the same PRB resource as its PUCCH resource. Accordingly, resource collision and interference may be avoided (or prevented) by performing an arithmetic operation, such as modulo (Cell ID, Z) (wherein Z may be set to Z=4), on the PRB starting index. For the remaining PRB allocation, just as described in Option 1, if N number of PRBs exist in the UL BWP, allocation is alternately performed starting from the PRBs located at symmetrical positions based on a N/2 point and progressing further away from the center of the UL BWP.

Meanwhile, a method for configuring a default PUCCH resource set and PUCCH resources within each set may correspond to the following methods, which are described below.

Set type 1: A resource set being configured of a combination of a single PUCCH format and a single {starting symbol position, number of symbols} set.

Set type 2: A resource set being configured of a combination of a single PUCCH format and multiple {starting symbol position, number of symbols} sets.

Set type 3: A resource set being configured of a combination of multiple PUCCH formats and multiple {starting symbol position, number of symbols} sets.

A difference value (or gap value) (hereinafter, $\Delta_{CS}$) between the cyclic shifts (CSs) may be differently configured for each resource set.

In (4), which is presented above, $\Delta_{CS}$ is defined as a different in CS values between adjacent PUCCH resource CSs within the same PRB, and it may be considered to individually (or separately) configure a PUCCH resource set for each $\Delta_{CS}$ value in common for all of the above-described cases. Additionally, in case of PUCCH format 0, when a CS index of an ACK sequence is given as x, a CS value of a NACK sequence may be paired and assigned (or allocated) with x+6, and, during the initial access procedure, the NACK sequence may not be transmitted. The CS capacity may be equal to $12/\Delta_{CS}/2$ (e.g., per PRB). And, in case of PUCCH format 1, the OCC capacity is respectively equal to 3 or 2 depending upon the number of symbols, i.e., 14 symbols or 10 symbols, and the CS capacity is equal to $12/\Delta_{CS}$. Additionally, for the multiplexing capacity of the PUCCH and an efficient resource allocation, the number of PRBs per PUCCH resource may be configured by using the two methods, which are described below.

Alternative 1: A method of equally supporting a multiplexing capacity per PUCCH resource set for each $\Delta_{CS}$ value.

(Total number of PRBs per PUCCH resource set=$\Delta_{CS}$*N)

Alternative 2: A method of equally configuring a number of PRBs per PUCCH resource set for each $\Delta_{CS}$ value.

(Total Number of PRBs Per PUCCH Resource Set=M)

When one PUCCH resource set is determined by using the RMSI based on the above-described methods, as a method for selecting a subset within the corresponding set, one subset may be selected from 4 subsets through a 2-bit ARI field within a Message 4 (Msg 4) scheduling DCI during the initial access procedure or through a 2-bit ARI field within a fallback DCI during the fallback operation. In this case, the ARI indication purpose within the DCI for each option may be interpreted as described below.

Option 1: In case of Set type 1, if all PUCCH resources within the PUCCH resource set have only one type of {starting symbol position, number of symbols}, a PRB-unit offset may be given as the DCI (ARI) in order to change the frequency resource. For example, in case 4 subsets exist in one PUCCH resource set, each subset may be configured of different PRB resources, and one subset may be indicated through the 2-bit ARI field within the DCI. As another example, in case of Alternative 1, the number of PRBs per subset may be configured to be equal to ($\Delta_{CS}$*N)/4, and, in case of Alternative 2, the number of PRBs per subset may be configured to be equal to M/4.

Option 2: In case of Set type 2, if the PUCCH resources within the PUCCH resource set have multiple types of {starting symbol position, number of symbols}, a change in the time and frequency resources, i.e., a {starting symbol position, number of symbols} shift, and a PRB-unit offset may be indicated by using the DCI (ARI). For example, when 4 subsets are configured of a combination of 2 types of PRB sets and 2 types of {starting symbol position, number of symbols}, one subset may be indicated by indicating a change in the time and frequency resources through the DCI (ARI).

For example, in case the PUCCH resource set is configured of 2 PRBs, PRB index 1 and PRB index 2, and is also configured of 2 types of {starting symbol position, number of symbols}, {S1, D1} and {S2, D2}, the 4 subsets may be configured of a combination of [PRB index 1, {S1, D1}], [PRB index 1, {S2, D2}], [PRB index 2, {S1, D1}], [PRB index 2, {S2, D2}]. As another example, in case of Alternative 1, the number of PRBs per subset may be configured to be equal to $(\Delta_{CS}*N)/2$, and, in case of Alternative 2, the number of PRBs per subset may be configured to be equal to M/2.

Option 3: In case of Set type 3, if the PUCCH resources within the PUCCH resource set have multiple types of {starting symbol position, number of symbols}, among 4 {starting symbol position, number of symbols}, one {starting symbol position, number of symbols} may be indicated by using the DCI (ARI). For example, when 4 subsets are configured of a combination of 4 types of {starting symbol position, number of symbols}, one subset may be indicated by using the 2-bit ARI field within the DCI. This indicates that the PUCCH resource according to the 4 types of {starting symbol position, number of symbols} combinations may be configured within the same PRB set, and, more specifically, this indicates that the PUCCH resources are configured in accordance with the {starting symbol position, number of symbols} combinations indicated by the DCI within the same PRB set. As another example, in case of Alternative 1, the number of PRBs per subset may be configured to be equal to $(\Delta_{CS}*N)$, and, in case of Alternative 2, the number of PRBs per subset may be configured to be equal to M.

When one subset is selected within the PUCCH resource set by using the above-described options, a method of selecting one PUCCH resource within the selected subset for each PUCCH format may be as described below.

(1) PUCCH Format 1

A PUCCH resource having one {PRB index, CS index, OCC index} may be selected from a PDCCH starting CCE index. For example, in case the number of PRBs per subset is equal to N, and, given that $\Delta_{CS}=d$, in case the CS capacity is equal to 12/d and the OCC capacity is equal to M, among the {N*(12/d)*M} number of PUCCH resources within the subset, one PUCCH resource may be indicated as {PDCCH starting CCE index} modulo {N*(12/d)*M}.

(2) PUCCH Format 0

A PUCCH resource having one {PRB index, CS index pair (x, x+6)} may be selected from a PDCCH starting CCE index. For example, in case the number of PRBs per subset is equal to N, and, given that $\Delta_{CS}=d$, in case the CS capacity is equal to 12/d/2=6/d, among the {M*(6/d)} number of PUCCH resources within the subset, once PUCCH resource may be indicated as {PDCCH starting CCE index} modulo {M*(6/d)}.

Another method for implicitly determining one subset within the PUCCH resource set and one PUCCH resource within the determined (or selected) subset will now be described. When all PUCCH resources (e.g., assuming that K number of PUCCH resources exist) are indexed in accordance with a specific rule starting from 0 to K–1 (0, 1, ..., K–1), a final PUCCH resource index may be determined as {L+S}, by indicating a large offset having a granularity of L=0, K/4, K/2, 3K/4 by using the 2-bit ARI field within the DCI and by assigning a small offset, such as S=(PDCCH starting CCE index) modulo (K/4), when one PUCCH resource is indicated within the subset.

According to the description presented above, the indexing method of the PUCCH resources configuring the PUCCH resource set may vary depending upon the PUCCH format. For example, in case of PUCCH format 1, the indexing may be performed by an order of "Index of a cyclic shift, Time-domain OCC index, PRB index", and, in case of PUCCH format 0, the indexing may be performed in an order of "Index of an initial cyclic shift, PRB index". For example, when 12 PUCCH resources configure one PUCCH resource set according to PUCCH format 1 having 10 symbols, and when it is assumed that 2 pairs of PRBs, $\Delta_{CS}=3$, and the PRB allocation Option 1 are used, the resource indexing may be performed as shown below in Table 6. Similarly, when a PUCCH resource set is configured of 8 PUCCH resources according to PUCCH format 0 having 2 symbols, and when it is assumed that 2 PRBs and $\Delta_{CS}=3$ are used, the resource indexing may be performed as shown below in Table 7. Table 6 corresponds to an example of PUCCH format 1 resource indexing, and Table 7 corresponds to an example of PUCCH format 1 resource indexing.

TABLE 6

| Resource index | 1$^{st}$ hop starting PRB index | Index of cyclic shift | Index of time-domain OCC |
|---|---|---|---|
| 1 | PRB 0 | 0 | 0 |
| 2 | PRB 0 | 3 | 0 |
| 3 | PRB 0 | 6 | 0 |
| 4 | PRB 0 | 9 | 1 |
| 5 | PRB 0 | 0 | 1 |
| 6 | PRB 0 | 3 | 1 |
| 7 | PRB N – 1 | 6 | 0 |
| 8 | PRB N – 1 | 9 | 0 |
| 9 | PRB N – 1 | 0 | 0 |
| 10 | PRB N – 1 | 3 | 1 |
| 11 | PRB N – 1 | 6 | 1 |
| 12 | PRB N – 1 | 9 | 1 |

TABLE 7

| Resource index | Starting PRB index | Index of cyclic shift |
|---|---|---|
| 1 | PRB 0 | 0 |
| 2 | PRB 0 | 3 |
| 3 | PRB 0 | 6 |
| 4 | PRB 0 | 9 |
| 5 | PRB N – 1 | 0 |
| 6 | PRB N – 1 | 3 |
| 7 | PRB N – 1 | 6 |
| 8 | PRB N – 1 | 9 |

As another PUCCH resource indexing method, in case of PUCCH format 1, indexing may be performed by an order of "PRB index, index of cyclic shift, time-domain OCC index" and, in case of PUCCH format 0, indexing may be performed by an order of "PRB index, index of initial cyclic shift". Under such indexing, if a CS gap $\Delta_{CS}$ is differently configured for each subset, a subset with a different multiplexing capacity per PRB may be dynamically selected through an ARI field within Msg. 4 DCI or fallback DCI. For example, for PUCCH format 1, 2 subsets each having a different $\Delta_{CS}$ value exist within the PUCCH resource set. When it is given that $\Delta_{CS}=2$ and $\Delta_{CS}=3$, indexing may be performed as shown in the example of Table 8 shown below. Also, for PUCCH format 0, 2 subsets each having a different $\Delta_{CS}$ value exist within the PUCCH resource set. When it is given that $\Delta_{CS}=2$ and $\Delta_{CS}=3$, indexing may be performed as shown in the example of Table 9 shown below. Therefore, after selecting a specific PUCCH resource set through the RMSI, during the initial access procedure, subsets (subsets each having a different multiplexing capacity per PRB) configured to have a specific CS gap $\Delta_{CS}$ may be dynamically indicated through the ARI within Msg. 4 DCI or fallback DCI. Table 8 corresponds to an example of PUCCH format 1 resource indexing, and Table 9 corresponds to an example of PUCCH format 1 resource indexing.

TABLE 8

| Resource subset | Resource index | 1st hop starting PRB index | Index of cyclic shift | Index of time-domain OCC |
|---|---|---|---|---|
| Subset 1 | 1 | PRB 0 | 0 | 0 |
| | 2 | PRB 0 | 2 | 0 |
| | 3 | PRB 0 | 4 | 0 |
| | 4 | PRB 0 | 6 | 0 |
| | 5 | PRB 0 | 8 | 0 |
| | 6 | PRB 0 | 10 | 0 |
| | 7 | PRB 0 | 0 | 1 |
| | 8 | PRB 0 | 2 | 1 |
| | 9 | PRB 0 | 4 | 1 |
| | 10 | PRB 0 | 6 | 1 |
| | 11 | PRB 0 | 8 | 1 |
| | 12 | PRB 0 | 10 | 1 |
| Subset 2 | 1 | PRB N − 1 | 0 | 0 |
| | 2 | PRB N − 1 | 3 | 0 |
| | 3 | PRB N − 1 | 6 | 0 |
| | 4 | PRB N − 1 | 9 | 0 |
| | 5 | PRB N − 1 | 0 | 1 |
| | 6 | PRB N − 1 | 3 | 1 |
| | 7 | PRB N − 1 | 6 | 1 |
| | 8 | PRB N − 1 | 9 | 1 |

TABLE 9

| Resource subset | Resource index | Starting PRB index | Index of cyclic shift |
|---|---|---|---|
| Subset 1 | 1 | PRB 0 | 0 |
| | 2 | PRB 0 | 2 |
| | 3 | PRB 0 | 4 |
| | 4 | PRB 0 | 6 |
| | 5 | PRB 0 | 8 |
| | 6 | PRB 0 | 10 |
| Subset 2 | 1 | PRB N − 1 | 0 |
| | 2 | PRB N − 1 | 3 |
| | 3 | PRB N − 1 | 6 |
| | 4 | PRB N − 1 | 9 |

Meanwhile, when K number of PUCCH resources are configured in one PUCCH resource set, in case the corresponding K value is not equal to a multiple of 4, e.g., in case a resource set being configured of PUCCH format 1 is configured of {PRB=1, $\Delta_{CS}$=2 (CS capacity=6), OCC capacity=3}, the K value may be set to K=18, and, when determining a large offset L value, such as L=0, L=floor(K/4), . . . , or L=0, L=ceil(K/4), . . . , the configured may be needed to be performed by using a ceiling( ) or floor( ) function. In this case, even in case of a small offset S, the corresponding value may be determined by S=(PDCCH starting CCE index) modulo floor(K/4) or S=(PDCCH starting CCE index) modulo ceil(K/4).

Examples of configuring the initial PUCCH resource set for the description presented above by using 4 different methods are respectively shown below in Table 10 to Table 13. Table 10 is an example of a case where a single $\Delta_{CS}$ value is configured per resource set (herein, Set Index 15 of Table 10 is exclusively assigned with a level of freedom in selecting the base station for $\Delta_{CS}$). And, Table 11 is an example of a case where all resource sets are configured of a single PUCCH format and a single $\Delta_{CS}$ value or multiple $\Delta_{CS}$ values. And, Table 12 and Table 13 are examples of a case where the resource sets are configured of a plurality of {starting symbol position, number of symbols} sets (wherein Set #4/5/6/7 are mainly excluded for the purpose of FDD, and wherein Set #0/1/2/3 are mainly excluded for the purpose of TDD).

TABLE 1C

| Set index | PUCCH format | {start symbol index, duration} | CS gap value |
|---|---|---|---|
| 0 | 0 | {13, 1} | 1 |
| 1 | 0 | {13, 1} | 2 |
| 2 | 0 | {13, 1} | 3 |
| 3 | 0 | {13, 1}, {12, 2} | 1 |
| 4 | 0 | {13, 1}, {12, 2} | 2 |
| 5 | 0 | {13, 1}, {12, 2} | 3 |
| 6 | 1 | {0, 14} | 1 |
| 7 | 1 | {0, 14} | 2 |
| 8 | 1 | {0, 14} | 3 |
| 9 | 1 | {0, 14}, {3, 10} | 1 |
| 10 | 1 | {0, 14}, {3, 10} | 2 |
| 11 | 1 | {0, 14}, {3, 10} | 3 |
| 12 | 0, 1 | {13, 1}, {12, 2}, {0, 14}, {3, 10} | 1 |
| 13 | 0, 1 | {13, 1}, {12, 2}, {0, 14}, {3, 10} | 2 |
| 14 | 0, 1 | {13, 1}, {12, 2}, {0, 14}, {3, 10} | 3 |
| 15 | 0, 1 | {13, 1}, {12, 2}, {0, 14}, {3, 10} | 1, 2, 3 |

TABLE 11

| Set index | PUCCH format | {start symbol index, duration} | CS gap value |
|---|---|---|---|
| 0 | 0 | {13, 1} | 1 |
| 1 | 0 | {13, 1} | 2 |
| 2 | 0 | {13, 1} | 3 |
| 3 | 0 | {13, 1} | 1, 2, 3 |
| 4 | 0 | {13, 1}, {12, 2} | 1 |
| 5 | 0 | {13, 1}, {12, 2} | 2 |
| 6 | 0 | {13, 1}, {12, 2} | 3 |
| 7 | 0 | {13, 1}, {12, 2} | 1, 2, 3 |
| 8 | 1 | {0, 14} | 1 |
| 9 | 1 | {0, 14} | 2 |
| 10 | 1 | {0, 14} | 3 |
| 11 | 1 | {0, 14} | 1, 2, 3 |
| 12 | 1 | {0, 14}, {3, 10} | 1 |
| 13 | 1 | {0, 14}, {3, 10} | 2 |
| 14 | 1 | {0, 14}, {3, 10} | 3 |
| 15 | 1 | {0, 14}, {3, 10} | 1, 2, 3 |

TABLE 12

| Set index | PUCCH format | {start symbol index, duration} | CS gap value |
|---|---|---|---|
| 0 | 0 | {13, 1}, {12, 2} | 1 |
| 1 | 0 | {13, 1}, {12, 2} | 2 |
| 2 | 0 | {13, 1}, {12, 2} | 3 |
| 3 | 0 | {13, 1}, {12, 2} | 1, 2, 3 |
| 4 | 1 | {0, 14} | 1 |
| 5 | 1 | {0, 14} | 2 |
| 6 | 1 | {0, 14} | 3 |
| 7 | 1 | {0, 14} | 1, 2, 3 |
| 8 | 1 | {0, 14}, {3, 10} | 1 |
| 9 | 1 | {0, 14}, {3, 10} | 2 |
| 10 | 1 | {0, 14}, {3, 10} | 3 |
| 11 | 1 | {0, 14}, {3, 10} | 1, 2, 3 |
| 12 | 0, 1 | {13, 1}, {12, 2}, {0, 14}, {3, 10} | 1 |
| 13 | 0, 1 | {13, 1}, {12, 2}, {0, 14}, {3, 10} | 2 |
| 14 | 0, 1 | {13, 1}, {12, 2}, {0, 14}, {3, 10} | 3 |
| 15 | 0, 1 | {13, 1}, {12, 2}, {0, 14}, {3, 10} | 1, 2, 3 |

TABLE 13

| Set index | PUCCH format | {start symbol index, duration} | CS gap value |
|---|---|---|---|
| 0 | 0 | {13, 1} | 1 |
| 1 | 0 | {13, 1} | 2 |
| 2 | 0 | {13, 1} | 3 |
| 3 | 0 | {13, 1} | 1, 2, 3 |
| 4 | 1 | {0, 14} | 1 |
| 5 | 1 | {0, 14} | 2 |
| 6 | 1 | {0, 14} | 3 |
| 7 | 1 | {0, 14} | 1, 2, 3 |
| 8 | 1 | {0, 14}, {3, 10} | 1 |
| 9 | 1 | {0, 14}, {3, 10} | 2 |
| 10 | 1 | {0, 14}, {3, 10} | 3 |
| 11 | 1 | {0, 14}, {3, 10} | 1, 2, 3 |
| 12 | 0, 1 | {13, 1}, {12, 2}, {0, 14}, {3, 10} | 1 |
| 13 | 0, 1 | {13, 1}, {12, 2}, {0, 14}, {3, 10} | 2 |
| 14 | 0, 1 | {13, 1}, {12, 2}, {0, 14}, {3, 10} | 3 |
| 15 | 0, 1 | {13, 1}, {12, 2}, {0, 14}, {3, 10} | 1, 2, 3 |

The above-described configuration and allocation method of a default PUCCH resource set may be summarized by the proposed methods that are presented below.

[Proposed Method #1] Each of a plurality of PUCCH resource sets may be configured only of a single PUCCH format and a single combination of {start/duration} and a single CS gap. In other words, at least one of PUCCH format, {start/duration}, CS gap may be differently configured between different sets.

[Proposed Method #2] Each of a plurality of PUCCH resource sets may be configured of a single PUCCH format and a single or multiple combinations of {start/duration} and a single CS gap. In other words, at least one of PUCCH format, CS gap may be differently configured between different sets.

[Proposed Method #3] Each of a plurality of PUCCH resource sets may be configured of a single PUCCH format and a single or multiple combinations of {start/duration} and a single or multiple CS gaps. In other words, the PUCCH format may be differently configured or a {start/duration} and CS gap combination may be differently configured between different sets.

[Proposed Method #4] Each of a plurality of PUCCH resource sets may be configured of a single or multiple PUCCH formats and a single or multiple combinations of {start/duration} and a single CS gap. In other words, the CS gap may be differently configured or a PUCCH format and a combination of {start/duration} may be differently configured between different sets.

[Proposed Method #5] Each of a plurality of PUCCH resource sets may be configured of a single or multiple PUCCH formats and a single or multiple combinations of {start/duration} and a single or multiple CS gaps.

Figure 13:
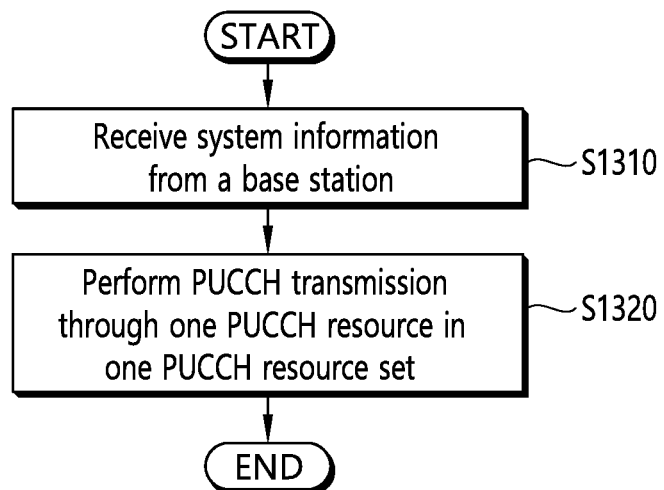
FIG. 13 shows a method for performing PUCCH transmission of a user equipment (UE) according to an exemplary embodiment of the present invention in a viewpoint of the UE.

FIG. 13 shows a method for performing PUCCH transmission of a user equipment (UE) according to an exemplary embodiment of the present invention in a viewpoint of the UE.

According to FIG. 13, the user equipment (UE) receives system information from a base station (S1310). Herein, the system information may include information for a PUCCH resource set of a plurality of PUCCH resource sets. Herein, each of the plurality of PUCCH resource sets may be related to a starting symbol, a number of symbols, and a PUCCH format. Additionally, herein, each of the plurality of PUCCH resource sets may be related to a combination of a starting symbol and a number of symbols, and a PUCCH format.

Thereafter, the UE performs PUCCH transmission based on a PUCCH resource in the PUCCH resource set (S1320).

Herein, the plurality of PUCCH resource sets may be predefined. Also, herein, the number of the predefined PUCCH resource sets may be equal to 16. Also, herein, each of the predefined plurality of PUCCH resource sets may be related to PUCCH format 0 or PUCCH format 1. Also, herein, the number of symbols in each of the predefined plurality of PUCCH resource sets may include 2 symbols, 10 symbols, and 14 symbols. Also, herein, the system information may be Remaining System Information (RMSI). Also, herein, each of the plurality of PUCCH resource sets may be configured to have a different gap value (or difference value) between cyclic shifts (CSs). Also, herein, the UE may be to a device (or user equipment) that is not configured to have a dedicated PUCCH resource. Also, herein, the PUCCH transmission may be an HARQ-ACK transmission of an initial access (IA) procedure. Also, herein, the one PUCCH resource may be selected based on the DCI and/or CCE index.

In other words, based on the above-described [Proposed Method #1], the exemplary embodiment of the present invention that is described in FIG. 13 relates to a method of performing PUCCH transmission by a user equipment (UE) by selecting a PUCCH resource set for the PUCCH transmission, in a case where each of the PUCCH resource sets is configured of one starting symbol, one number of symbols, and one PUCCH format. Herein, one PUCCH resource set may be configured of one combination of a single starting symbol and number of symbols, and one PUCCH format. Herein, the plurality of PUCCH resource sets (e.g., 16 PUCCH resource sets) may be predefined and may be defined as shown in Table 4 and Table 5. Also, herein, the above-described method may be restrictedly used for the HARQ-ACK transmission in an initial access step (or phase) or a fallback step. Also, herein, the above-described method may be used until a point prior to the configuration of a dedicated PUCCH resource in the UE. Also, herein, when the UE is configured to have a dedicated PUCCH resource, the dedicated PUCCH may be used at a higher priority level as compared to the predetermined plurality of PUCCH resource sets.

By performing the above-described method, PUCCH transmission resource selection and its respective PUCCH transmission may be more efficiently achieved in the NR system, which considers flexibility and adopts a new structure.

Figure 14:
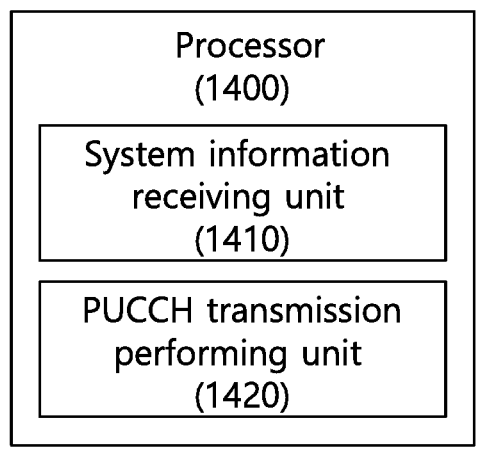
FIG. 14 shows a user equipment (UE) for performing PUCCH transmission according to an exemplary embodiment of the present invention, in a viewpoint of the UE.

FIG. 14 shows a user equipment (UE) for performing PUCCH transmission according to an exemplary embodiment of the present invention, in a viewpoint of the UE.

According to FIG. 14, a processor (1400) may include a system information receiving unit (1410) and a PUCCH transmission performing unit (1420). Herein, the processor may refer to a processor of a user equipment (UE) that will be described later on with reference to FIG. 18 to FIG. 21.

The system information receiving unit (1410) may receive system information being transmitted from the base station. The system information may include information on one PUCCH resource set, among a plurality of PUCCH resource sets. Since a detailed example of the system information and a configuration for receiving the system information have already been described above, overlapping description of the same will be omitted.

The PUCCH transmission performing unit (1420) may perform the PUCCH transmission based on the received system information. Since a detailed example of a configuration for performing the PUCCH transmission has already been described above, overlapping description of the same will be omitted.

Figure 15:
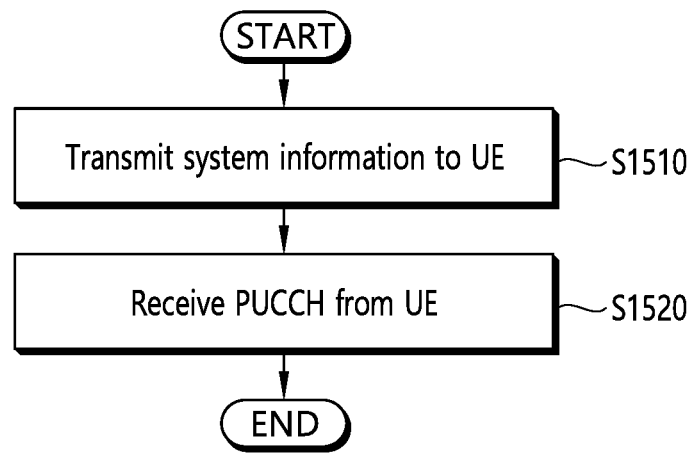
FIG. 15 shows a method for performing PUCCH reception according to an exemplary embodiment of the present invention, in a viewpoint of a base station.

FIG. 15 shows a method for performing PUCCH reception according to an exemplary embodiment of the present invention, in a viewpoint of a base station.

According to FIG. 15, the base station may transmit system information to a user equipment (UE) (S1510). Herein, the base station may transmit the system information by broadcasting the corresponding system information. Also, herein, the system information may include information on one PUCCH resource set, among a plurality of PUCCH resource sets. Since a detailed example of the system information and a configuration for transmitting the system information have already been described above, overlapping description of the same will be omitted.

Thereafter, the base station may receive a PUCCH from the user equipment (UE) (S1520). Herein, the PUCCH may be transmitted based on one PUCCH resource set, among a plurality of PUCCH resource sets. Since a detailed example of a configuration for receiving the PUCCH has already been described above, overlapping description of the same will be omitted.

Figure 16:
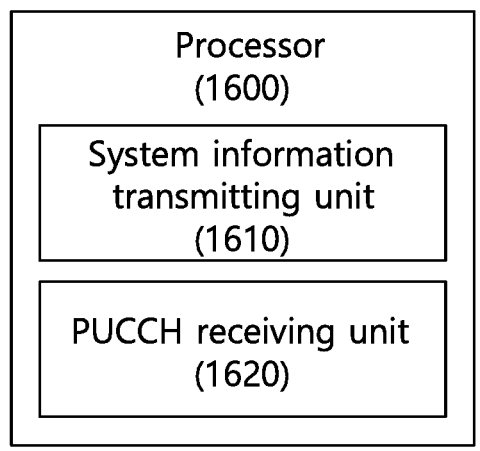
FIG. 16 shows a user equipment (UE) for performing PUCCH transmission according to an exemplary embodiment of the present invention, in the viewpoint of the base station.

FIG. 16 shows a user equipment (UE) for performing PUCCH transmission according to an exemplary embodiment of the present invention, in the viewpoint of the base station.

According to FIG. 16, a processor (1600) may include a system information transmitting unit (1610) and a PUCCH receiving unit (1620). Herein, the processor may refer to a processor of a user equipment (UE) that will be described later on with reference to FIG. 18 to FIG. 21.

The system information transmitting unit (1610) may transmit system information to the UE. Herein, since a detailed example of the system information and a configuration for transmitting the system information have already been described above, overlapping description of the same will be omitted.

The PUCCH receiving unit (1620) may receive a PUCCH that is transmitted by the UE. Herein, the PUCCH resource set may be determined by the UE based on the receive system information. Since a detailed example of a configuration for receiving the PUCCH has already been described above, overlapping description of the same will be omitted.

Figure 17:
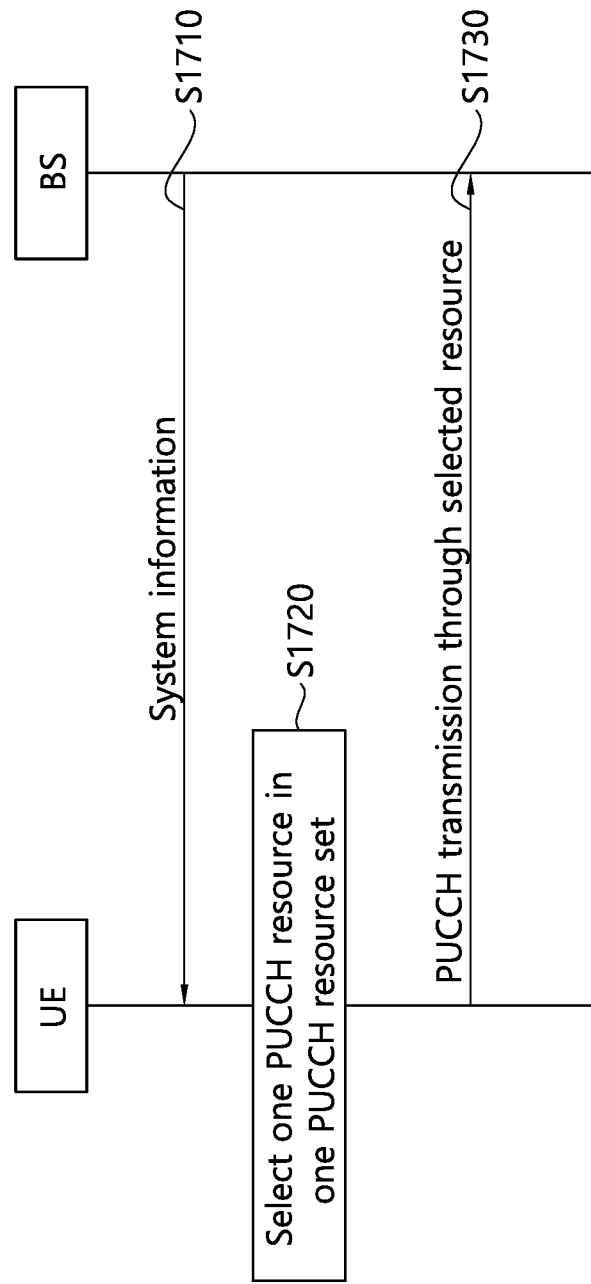
FIG. 17 is a general schematization of a PUCCH transmission procedure according to an exemplary embodiment of the present invention based on FIG. 13 and FIG. 15.

FIG. 17 is a general schematization of a PUCCH transmission procedure according to an exemplary embodiment of the present invention based on FIG. 13 and FIG. 15.

According to FIG. 17, the UE receives system information from the base station (S1710). Herein, the system information may include information on one PUCCH resource set, among a plurality of PUCCH resource sets. Herein, each of the plurality of PUCCH resource sets may be related to one starting symbol, one number of symbols, and one PUCCH format. Additionally, herein, each of the plurality of PUCCH resource sets may be related to one combination of a starting symbol and a number of symbols, and one PUCCH format.

Thereafter, the UE selects one PUCCH resource from the one PUCCH resource set (S1720). Herein, the UE receives the DCI, and, afterwards, the UE may select one PUCCH resource from the PUCCH resources existing in one PUCCH resource set among the plurality of PUCCH resource sets, by using the number of Control Channel Elements (CCEs) existing in a control resource set for the reception of the PDCCH having DCI format 1_0 or DCI format 1_1, an index of a first CCE for the PDCCH reception, and a PUCCH resource indicator field within the DCI format 1_0 or DCI format 1_1. For this, as described above, an equation of $$r_{PUCCH} = \left\lfloor \frac{2 \cdot n_{CCE,0}}{N_{CCE}} \right\rfloor + 2 \cdot \Delta_{PRI}$$

may be used. Herein, $N_{CCE}$ indicates a number of Control Channel Elements (CCEs) existing in a control resource set for the reception of the PDCCH having DCI format 1_0 or DCI format 1_1, $n_{CCE,0}$ indicates an index of a first CCE for the PDCCH reception, and $\Delta_{PRI}$ indicates a PUCCH resource indicator field within the DCI format 1_0 or DCI format 1_1.

Alternatively, as described above, the UE may select one subset from 4 subsets within the PUCCH resource set tat is configured through the 2-bit ARI field, which is included in the DCI, and the UE may also select one PUCCH resource within a subset that is implicitly mapped from the PDCCH starting CCE index. However, this is merely part of diverse examples. And, therefore, other diverse methods disclosed in this specification and a combination of two or more of such methods may be used.

Thereafter, the UE performs PUCCH transmission based on the selected PUCCH resource (S1730). Herein, the PUCCH transmission may be an HARQ-ACK transmission.

Meanwhile, in case the PUCCH format 0 considers an operation of not performing PUCCH transmission in case of a NACK during the initial access procedure, the CS capacity is equal to $12/\Delta_{CS}$. In this case, the default PUCCH resource set configuration may be predefined or based on a specific rule as a resource set having no CS pairing and being used for the initial access procedure and a fallback-dedicated CS pairing resource set, and, then, it may be considered to follow the default PUCCH resource set being defined for the usage in the initial access procedure, and, then, when a fallback operation is indicated, it may be considered to transmit the PUCCH by implicitly using the resource of a fallback-dedicated default PUCCH resource set. For example, if the PUCCH resource set for the initial access procedure uses 6 CS resources per PRB, the fallback-dedicated PUCCH resource set may use the resources within the corresponding PRBs by sequentially grouping 2 resources to 3 sets (or groups), as agreed in advance.

Additionally, when a CS resource is allocated to the resources included in the default PUCCH resource set for PUCCH format 0, due to an imbalance in the number of CS resources per PRB within a set, a CS resource pair of an ACK/NACK sequence that is to be used by a PUCCH of a PDSCH, which is scheduled with a normal DCI by the same PRB, may be limited (or restricted). Therefore, instead of performing consecutive CS index allocation, indexing may be performed by determining a specific rule. For example, in case of PUCCH format 0, when it is assumed that $\Delta_{CS}=2$ and one PUCCH resource set is configured of a total of 6 resources and 2 PRBS, when each of resource #1 to resource #4 respectively allocates CS resource 0/3/6/9 to PRB 0, and when each of resource #5 and resource #6 respectively allocates CS resource 0/3 to PRB 1, an imbalance in the CS resources per PRB occurs, and, as a result, in PRB 1, the PUCCH for a normal PDSCH becomes incapable of using all of CS resource (0, 6), (3, 9) (the ACK/NACK sequence should be paired at a CS gap (or difference) of 6). Therefore, if each of resource #1 to resource #4 respectively allocates CS resource 0/6/3/9 to PRB 0, and when each of resource #5 and resource #6 respectively allocates CS resource 0/6 to PRB 1, the PUCCH for the normal PDSCH may be capable of using all of the remaining CS resources (1, 7), (2, 8), (3, 9), (4, 10) excluding (0, 6).

Additionally, for PUCCH format 1, considering the transmission of PUCCH format 0 to the $12^{th}$ or $13^{th}$ symbol within a slot, the transmission may be performed in a shortened PUCCH format excluding the $12^{th}$ and $13^{th}$ symbols. For example, in case of a 10-symbol PUCCH of PUCCH format 1, the transmission starts from the $4^{th}$ symbol of the slot, and, then, the last $14^{th}$ symbol may not be transmitted for the 1-symbol PUCCH format 0. Additionally, even in case of a 14-symbol PUCCH, an operation of not transmitting the 13$^{th}$ or 14$^{th}$ symbol for the 1-symbol or 2-symbol PUCCH transmission may also be considered. If the number of transmission symbols is reduced, the multiplexing capacity of the shortened PUCCH format 1 may also be reduced accordingly.

Since UEs having diverse BW sizes of an initial UL BWP exist, a method of varying the configuration of the default PUCCH resource set in accordance with the size of Initial UL BWP may be considered. For example, when it is assumed that UE A having an initial UL BWP size of 100 RB and UE B having an initial UL BWP size of 50 RB exist, the PRB within the PUCCH resource set of UE B may be configured to have a larger number of PUCCH transmissions to be processed via CDM as compared to the UE of 100 RB, so that the entire PUCCH resource set can be configured to have the same multiplexing capacity. Alternatively, the same multiplexing capacity per PRB may be maintained, and UE A may be configured by using a larger number of PRBs in its PUCCH resource set.

Meanwhile, the above-described description of the present invention will not be limited only to a direction communication between UEs and may, therefore, be also used in an uplink or a downlink. At this point, the base station or a relay node, and so on, may use the methods presented above.

Examples of the above-described proposed methods may also be included as one of the implementation methods of the present invention. And, therefore, it is an evident fact that the above-described examples can be understood as a type of proposed methods. Additionally, although the above-described proposed methods can be implemented independently, the method may also be implemented as a combined (or integrated) form of part of the proposed methods. For the information on the application or non-application of the proposed methods (or information on the rules of the proposed methods), a rule may be defined so that the information can be notified through a signal (e.g., a physical layer signal or a higher layer signal), which is predefined by the base station to the UE or by a transmitting UE to a receiving UE.

Figure 18:
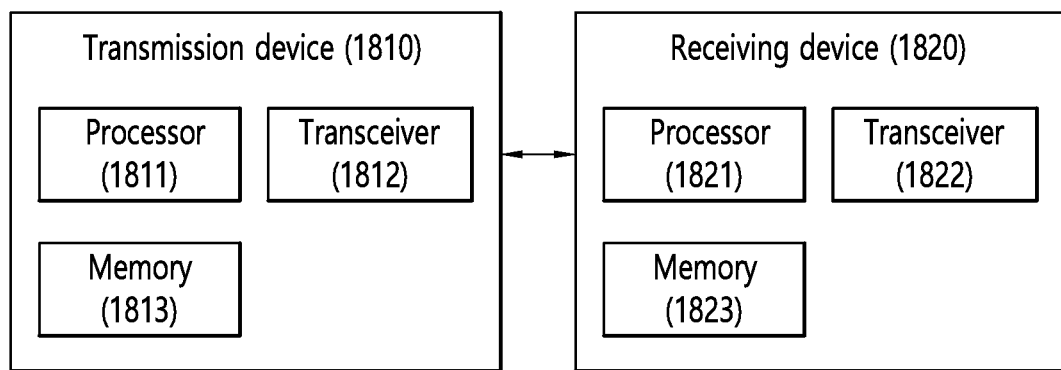
FIG. 18 is a block diagram showing components of a transmitting device 1810 and a receiving device 1820 for implementing the present invention.

FIG. 18 is a block diagram showing components of a transmitting device 1810 and a receiving device 1820 for implementing the present invention. Here, the transmitting device and the receiving device may be a base station and a terminal.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present invention.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present invention. The processors 1811 and 1821 may be referred to as controllers, microcontrollers, microprocessors, microcomputers, etc. The processors 1811 and 1821 can be realized by hardware, firmware, software or a combination thereof. When the present invention is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present invention. When the present invention is realized using firmware or software, the firmware or software may be configured to include modules, procedures or functions for performing functions or operations of the present invention, and the firmware or software configured to implement the present invention may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present invention. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 19:
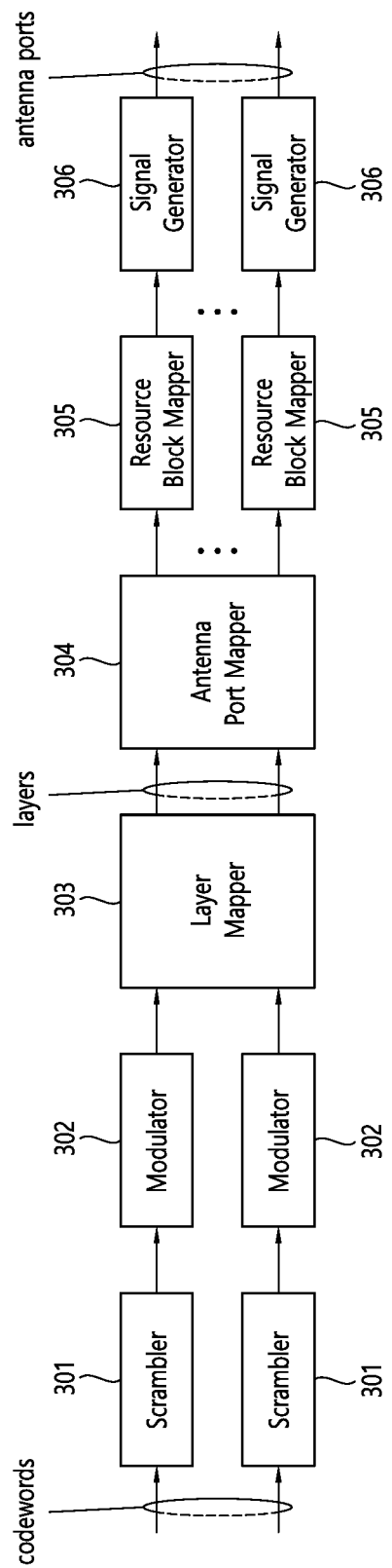
FIG. 19 illustrates an example of a signal processing module structure in the transmitting device 1810.

FIG. 19 illustrates an example of a signal processing module structure in the transmitting device 1810. Here, signal processing can be performed by a processor of a base station/terminal, such as the processors 1811 and 1821 of FIG. 18.

Referring to FIG. 18, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 20:
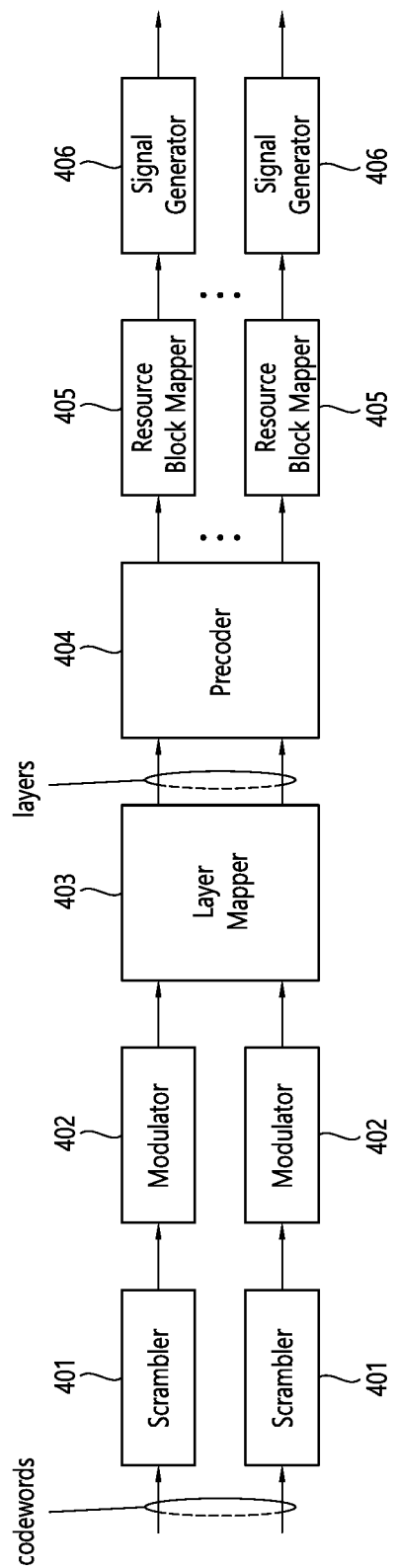
FIG. 20 illustrates another example of the signal processing module structure in the transmitting device 1810.

FIG. 20 illustrates another example of the signal processing module structure in the transmitting device 1810. Here, signal processing can be performed by a processor of a terminal/base station, such as the processors 1811 and 1821 of FIG. 18.

Referring to FIG. 20, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit for restoring received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit for removing a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 21:
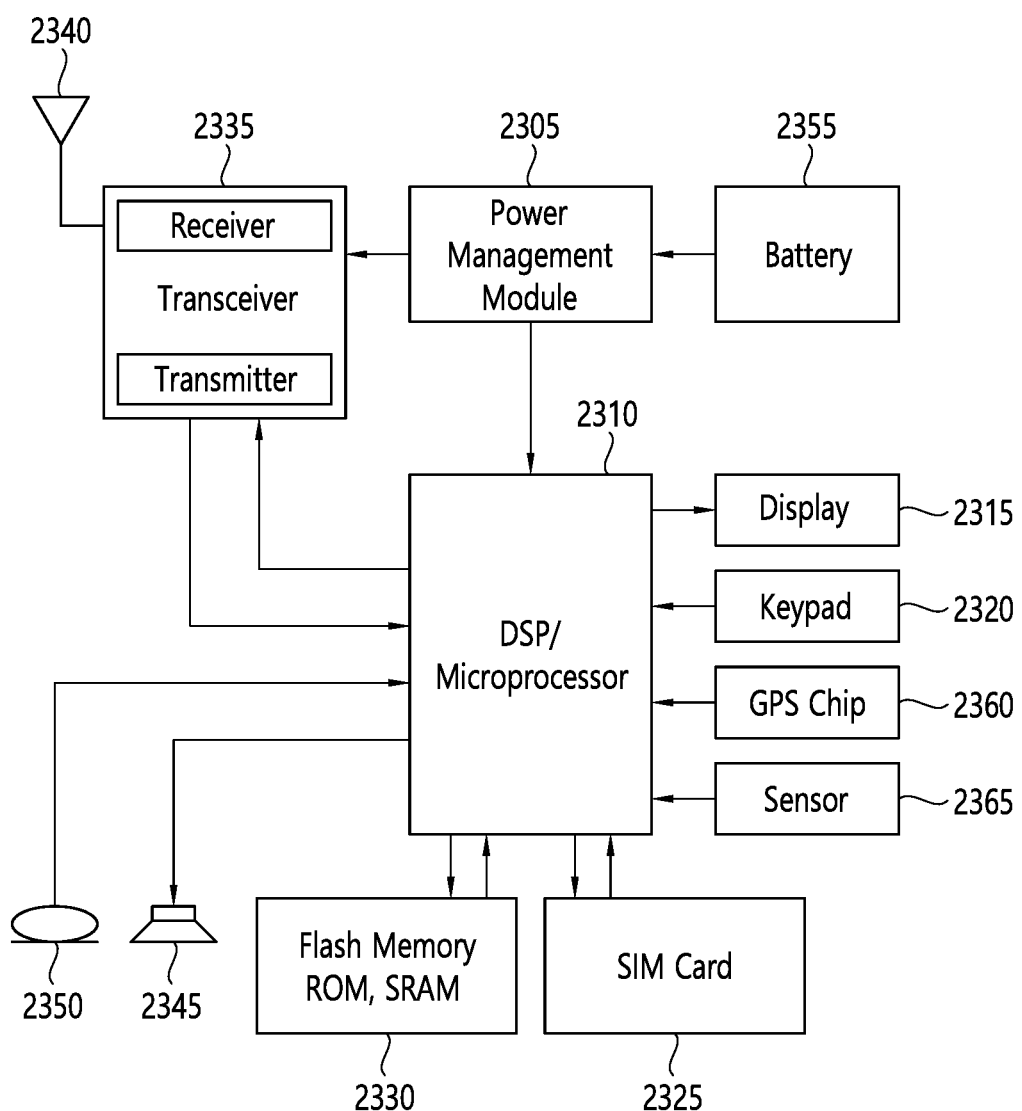
FIG. 21 illustrates an example of a wireless communication device according to an implementation example of the present invention.

FIG. 21 illustrates an example of a wireless communication device according to an implementation example of the present invention.

Referring to FIG. 21, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 21 may be the processors 1811 and 1821 in FIG. 18.

The memory 2330 is connected to the processor 2310 and stores information related to operations of the processor. The memory may be located inside or outside the processor and connected to the processor through various techniques such as wired connection and wireless connection. The memory 2330 in FIG. 21 may be the memories 1813 and 1823 in FIG. 18.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 21 may be the transceivers 1812 and 1822 in FIG. 18.

Although not shown in FIG. 21, various components such as a camera and a universal serial bus (USB) port may be additionally included in the terminal. For example, the camera may be connected to the processor 2310.

FIG. 21 is an example of implementation with respect to the terminal and implementation examples of the present invention are not limited thereto. The terminal need not essentially include all the components shown in FIG. 21. That is, some of the components, for example, the keypad 2320, the GPS chip 2360, the sensor 2365 and the SIM card 2325 may not be essential components. In this case, they may not be included in the terminal.

What is claimed is:

1. A method for performing a hybrid automatic repeat request-acknowledgement (HARQ-ACK) transmission in a wireless communication system, the method performed by a user equipment (UE) and comprising:
   receiving system information from a base station, wherein the system information informs the UE of a physical uplink control channel (PUCCH) resource set among a plurality of PUCCH resource sets, wherein each of the plurality of PUCCH resource sets is pre-defined, and
   performing the HARQ-ACK transmission on a PUCCH based on a PUCCH resource in the PUCCH resource set,
   wherein each of the plurality of PUCCH resource sets informs the UE of a starting symbol, a number of symbols and a PUCCH format of the PUCCH resource set,
   wherein the PUCCH format of each of the plurality of PUCCH resource sets is either PUCCH format 0 or PUCCH format 1.

2. The method of claim 1, wherein a number of the pre-defined plurality of PUCCH resource sets is 16.

3. The method of claim 1, wherein the UE is not configured with a dedicated PUCCH resource.

4. The method of claim 1, wherein the UE performs the HARQ-ACK transmission on the PUCCH based on the PUCCH resource in the PUCCH resource set during an initial access procedure.

5. The method of claim 1,
   wherein the PUCCH format 0 is a format for up to a 2-bit payload size and for 1 or 2 symbols configured for the PUCCH, and
   wherein the PUCCH format 1 is a format for up to a 2-bit payload size and for 4 to 14 symbols configured for the PUCCH.

6. The method of claim 1, wherein a number of symbols of the pre-defined plurality of PUCCH resource sets includes 2, 10, and 14.

7. A user equipment (UE) comprising:
   a transceiver; and
   a processor operatively connected to the transceiver,
   wherein the processor is configured to:
   receive system information from a base station, wherein the system information informs the UE of a physical uplink control channel (PUCCH) resource set among a plurality of PUCCH resource sets, wherein each of the plurality of PUCCH resource sets is pre-defined, and
   perform a hybrid automatic repeat request-acknowledgement (HARQ-ACK) transmission on a PUCCH based on a PUCCH resource in the PUCCH resource set,
   wherein each of the plurality of PUCCH resource sets informs the UE of a starting symbol, a number of symbols, and a PUCCH format of the PUCCH resource set,
   wherein the PUCCH format of each of the plurality of PUCCH resource sets is either PUCCH format 0 or PUCCH format 1.

8. The user equipment of claim 7, wherein a number of the pre-defined plurality of PUCCH resource sets is 16.

9. The user equipment of claim 7, wherein a number of symbols of the pre-defined plurality of PUCCH resource sets includes 2, 10, and 14.

* * * * *